United States Patent
Kwon et al.

(10) Patent No.: US 6,844,698 B1
(45) Date of Patent: Jan. 18, 2005

(54) DEVICE AND METHOD FOR CONTROLLING SUPPLY OF CURRENT AND STATIC CAPACITANCE TO COMPRESSOR

(75) Inventors: Soon Kwang Kwon, Pusan (KR); Sung Yeob Lim, Kyongsangnam-do (KR); Gyeong Yeol Noh, Kyongsangnam-do (KR); Chang Woong An, Kyongsangnam-do (KR); Kam Gyu Lee, Pusan (KR)

(73) Assignee: LG Electronics Inc., Seoul (KR)

( * ) Notice: Subject to any disclaimer, the term of this patent is extended or adjusted under 35 U.S.C. 154(b) by 55 days.

(21) Appl. No.: 10/111,809
(22) PCT Filed: Oct. 17, 2000
(86) PCT No.: PCT/KR00/01163
§ 371 (c)(1),
(2), (4) Date: Apr. 29, 2002
(87) PCT Pub. No.: WO01/35520
PCT Pub. Date: May 17, 2001

(30) Foreign Application Priority Data

| Nov. 12, 1999 | (KR) | 1999-50263 |
| Jul. 1, 2000 | (KR) | 2000-37562 |
| Jul. 1, 2000 | (KR) | 2000-37563 |
| Jul. 1, 2000 | (KR) | 2000-37564 |
| Jul. 1, 2000 | (KR) | 2000-37565 |
| Jul. 1, 2000 | (KR) | 2000-37566 |
| Jul. 1, 2000 | (KR) | 2000-37567 |
| Jul. 1, 2000 | (KR) | 2000-37568 |
| Jul. 1, 2000 | (KR) | 2000-37570 |

(51) Int. Cl.$^7$ ............................................. H02P 7/36
(52) U.S. Cl. .................. 318/778; 318/254; 318/434; 318/432; 318/439
(58) Field of Search ............................... 318/432, 439, 318/778, 767, 766, 788, 780, 782, 787, 793, 783, 785, 434

(56) References Cited

U.S. PATENT DOCUMENTS

| 4,012,678 A | * | 3/1977 | Blaha | 318/794 |
| 4,084,202 A | * | 4/1978 | Stoll | 361/24 |
| 4,107,583 A | * | 8/1978 | Houtman | 318/781 |
| 4,465,960 A | * | 8/1984 | Pfarrer | 318/774 |
| 4,465,962 A | * | 8/1984 | Kirschbaum | 318/817 |
| 5,162,718 A | * | 11/1992 | Schroeder | 318/794 |

(List continued on next page.)

FOREIGN PATENT DOCUMENTS

| DE | 36 30 604 A1 | 3/1988 |
| EP | 0 401 570 A2 | 6/1990 |
| EP | 0 410 330 A2 | 7/1990 |
| JP | 9-250819 | 9/1997 |

*Primary Examiner*—Rina Duda
*Assistant Examiner*—Renata McCloud
(74) *Attorney, Agent, or Firm*—Birch, Stewart, Kolasch & Birch, LLP

(57) ABSTRACT

Device and method for controlling supply of current and static capacitance to compressors, the device including a control signal providing part for providing control signals for controlling currents and static capacitances to be supplied to main windings and supplementary winding of the compressors, a current controlling part for limiting a current of the utility voltage supply in supplying the current to the main windings during starting in response to the control signals and releasing the limiting of the current in the supplying to the main windings after the starting, and a static capacitance controlling part for supplying respective starting static capacitances to the supplementary windings in a sequence in starting, and respective operative static capacitances to the supplementary windings in starting, and supplying only the respective operative static capacitances to the supplementary windings after the starting, in response to the control signals.

78 Claims, 14 Drawing Sheets

U.S. PATENT DOCUMENTS

| | | | | |
|---|---|---|---|---|
| 5,300,871 A | * | 4/1994 | Bucher et al. | 318/794 |
| 5,345,126 A | * | 9/1994 | Bunch | 310/68 C |
| 5,451,853 A | * | 9/1995 | Itoh | 318/788 |
| 5,559,418 A | * | 9/1996 | Burkhart | 318/785 |
| 5,561,357 A | * | 10/1996 | Schroeder | 318/789 |
| 5,898,289 A | * | 4/1999 | Hamatani | 318/788 |
| 6,034,503 A | * | 3/2000 | Pertessis | 318/785 |
| 6,040,679 A | * | 3/2000 | Monk et al. | 318/778 |
| 6,122,154 A | * | 9/2000 | Damerow et al. | 361/32 |
| 6,249,104 B1 | * | 6/2001 | Janicek | 318/791 |
| 6,320,348 B1 | * | 11/2001 | Kadah | 318/785 |
| 6,342,994 B1 | * | 1/2002 | Cousy et al. | 361/24 |
| 6,407,530 B1 | * | 6/2002 | Kwon et al. | 318/778 |

* cited by examiner

US 6,844,698 B1

DEVICE AND METHOD FOR CONTROLLING SUPPLY OF CURRENT AND STATIC CAPACITANCE TO COMPRESSOR

This application is the national phase under 35 U.S.C. §371 of PCT International Application No. PCT/KR00/01163 which has an International filing date of Oct. 17, 2000, which designated the United States of America.

TECHNICAL FIELD

The present invention relates to device and method for controlling supply of current and static capacitance to compressors.

BACKGROUND ART

FIG. 1 illustrates a diagram showing a related art device for controlling supply of current and static capacitance to a compressor.

Referring to FIG. 1, a related art device for controlling supply of current and static capacitance to a compressor is provided with a utility power supply 1, a first relay 2 for being turned on/off in response to a control signal from the compressor, a reactor 3 for absorbing a reactive power from the utility power supplied through the utility power supply 1 according to the turning on/off operation of the first relay 2, and providing the utility power to a main winding C1 of a compressor motor 'M', a second relay 4 for monitoring a voltage on the reactor 3, a first contact 4a connected parallel to the third reactor 3 for being opened or closed by the second relay 4, an operating capacitor 5 connected in parallel to the third reactor 3, a starting capacitor 6 connected in parallel with the operating capacitor 5, a third relay 7 for monitoring a voltage at starting, a second contact 7a fitted to a fore end of the second relay 4 for being opened or closed by the third relay, and a third contact 7b fitted to a rear end of the starting capacitor.

The operation of the foregoing related art device will be explained.

Upon application of the control signal from the compressor, the first relay 2 is turned on, to supply a power to the main winding C1 of the compressor motor 'M' through the third reactor 3. In this instance, the third reactor 3 removes a reactive power from the power to the main winding. On the other hand, the utility power is supplied to a supplementary winding of the compressor motor 'M' through the parallel circuit of the operating capacitor 5 and the starting capacitor 6 as the third contact 7b is closed. Referring to a region 8 in FIG. 1, at an initial starting of the compressor, since the compressor motor 'M' is not rotated, a voltage to the third relay 7 is too low to put the third relay 7 into action. And, if the compressor motor 'M' becomes to rotate at a revolution higher than a preset value as the voltage on the third relay 7 rises according to the rotation of the compressor motor 'M', the third relay 7 comes into action, to close the second contact 7a and to open the third contact 7b. Since the second relay 4 comes into action as the second contact 7a is closed, the first contact 4a is closed to turn off the third reactor 3 and to open the third contact 7b, to isolate the starting capacitor from the circuit. That is, at the moment of starting, the third reactor 3 becomes to be connected to the compressor motor 'M' in series to limit an excessive current, and the starting capacitor 6 provides a greater capacitance to the supplementary winding C2 to improve starting characteristics of the compressor.

However, the related art device for controlling supply of current and static capacitance to a compressor has the following disadvantages.

First, there have been frequent troubles in the region 8 at which a starting capacitance is controlled.

Second, the mechanical system of the device for supplying power to the compressor costs high.

Third, the starting control by the voltage rise following rotation of the compressor motor 'M' can not define a starting current accurately and has a poor starting characteristic.

Fourth, the generation of excessive current in starting of the compressor actuates the circuit breaker, gives bad influences to peripheral device of the compressor, and has inconvenience in restoring the compressor to an original state.

DISCLOSURE OF INVENTION

Accordingly, the present invention is directed to device and method for controlling supply of current and static capacitance to a compressor that substantially obviates one or more of the problems due to limitations and disadvantages of the related art.

An object of the present invention is to provide device and method for controlling supply of power to more than two compressors.

Another object of the present invention is to provide device and method for controlling supply of current and static capacitance to a compressor, which can prevent flow of excessive current to a main winding of the compressor.

Other object of the present invention is to provide device and method for making a user to cognize a state of current to a main winding of the compressor.

Further object of the present invention is to provide device and method for supplying a stable voltage to a compressor regardless of variation of an external utility voltage.

Still another object of the present invention is to provide device and method for preventing internal contacts suffer from damage caused by sharp current concentration during starting and operation of the compressor.

Still other object of the present invention is to provide device and method for making a stable supply of power to a compressor consistent to an external temperature and season.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device and method includes a controlling signal generating part for sensing a state of a utility voltage, i.e., a size and frequency of the utility voltage at first. Then, the controlling signal generating part classifies an operation time period into a starting time period and a time period after the starting time period, and generates a phase control signal for controlling currents to main windings of the compressors to be different according to a result of comparison that the utility voltage being higher or lower than a preset value in starting. And, the control signal generating part provides a switching control signal for changing an internal circuit of the device such that a starting static capacitance is provided to respective supplementary windings of the compressors in the starting in a sequence, and the current is provided to respective main windings of the compressors in common different before and after the starting. And, the control signal generating part can generate the switching control signal and the phase control signal appropriately varying with an external temperature state of the compressors, seasons, and a present state of current supplied to compressor motors. The control signal generating part controls supply of the current of the utility voltage by controlling a phase thereof. The present invention suggests to use a triac or a negative temperature coefficient resister for controlling the phase of the current.

In the meantime, a current controlling part controls the phase of the current of the utility voltage in response to the phase control signal, and has an internal circuit changeable in response to the switching control signal for limiting the current of the utility voltage in supplying the current to the main windings on the same time in starting of the compressors, and supplying the current of the utility voltage to the main windings regularly on the same time after the starting.

In the meantime, a static capacitance controlling part has an internal circuit changeable in response to the switching control signal for supplying respective starting static capacitances from the current of the utility voltage supply to the supplementary windings in a sequence in starting, and respective operative static capacitances from the current of the utility voltage supply to the supplementary windings on the same time in starting, and supplying only the respective operative static capacitances from the current of the utility voltage supply to the supplementary windings on the same time after the starting, in response to the control signals. The current controlling part and the static capacitance controlling part have switches respectively for varying the internal circuits in response to the control signals, and the control signal generating part generates the switching control signal different before and after the starting, in response to which the switches are operative in opposite directions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Figure 1:
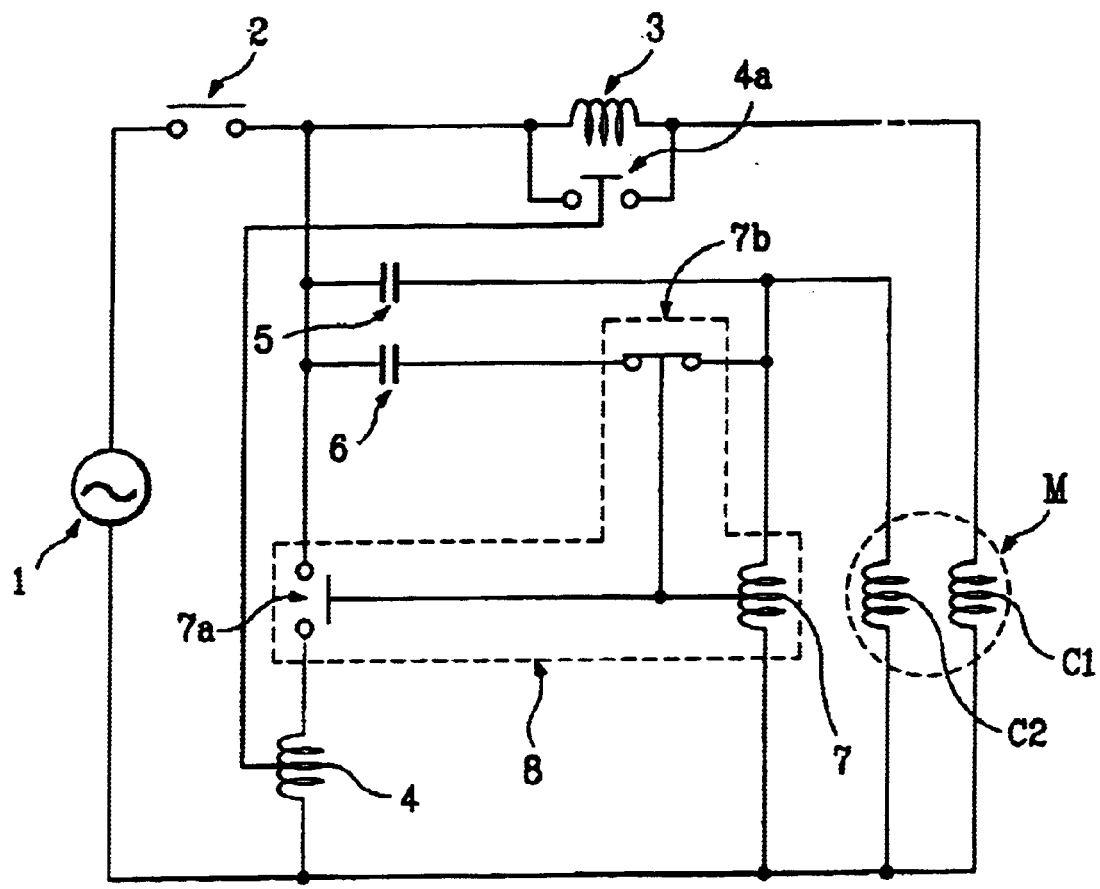
FIG. 1 illustrates a diagram showing a related art device for controlling supply of current and static capacitance to compressors.
Figure 2:
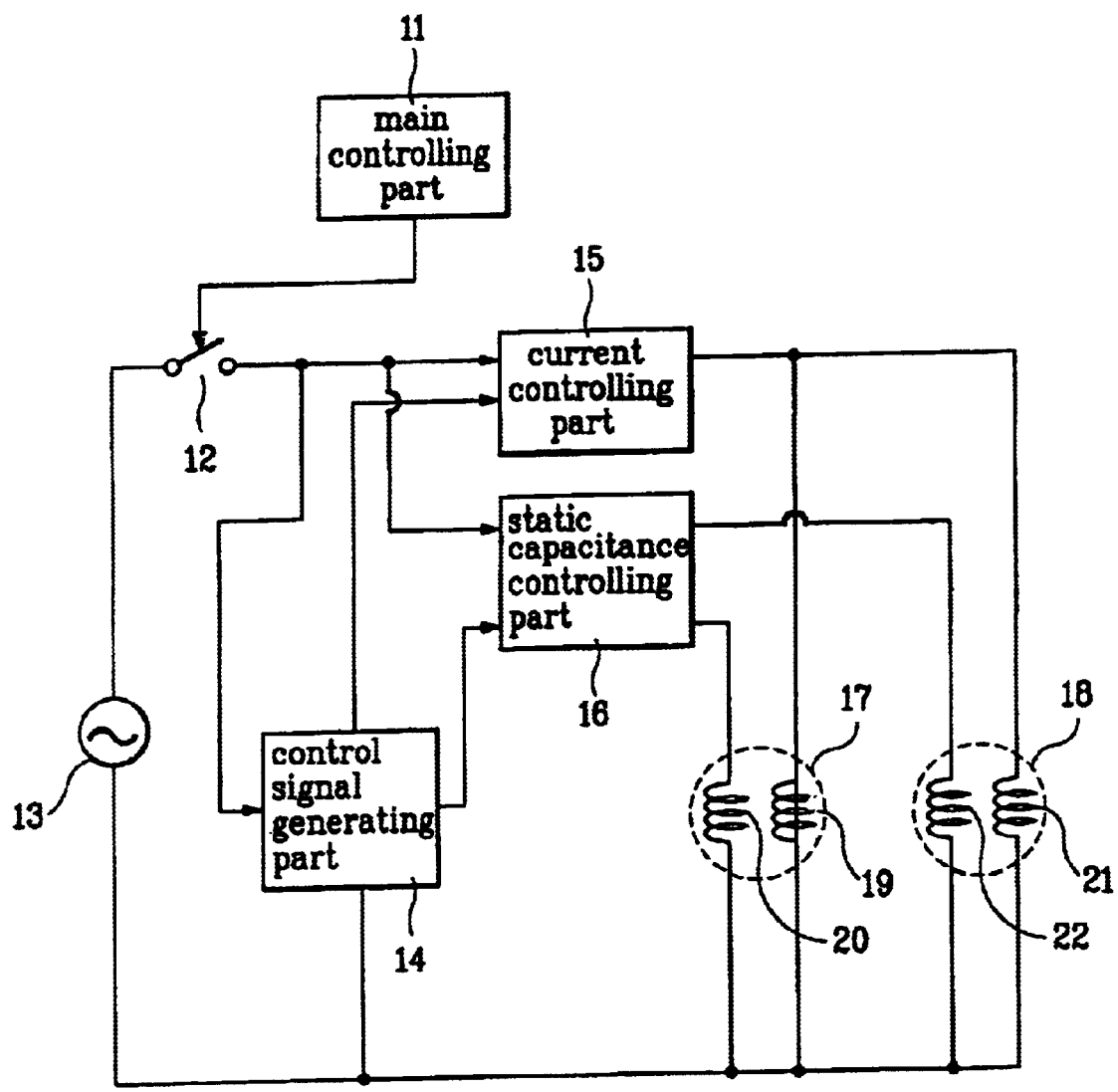
FIG. 2 illustrates a diagram showing concept of a device for controlling supply of current and static capacitance to compressors of the present invention.

Reference will now be made in detail to the preferred embodiments of the present invention, examples of which are illustrated in the accompanying drawings. FIG. 2 illustrates a diagram showing concept of a device for controlling supply of current and static capacitance to compressors of the present invention.

Referring to FIG. 2, the device for controlling supply of current and static capacitance to a compressor of the present invention includes a main controlling part 11 for controlling overall operation of the compressor, and generating a turn on/off signal for the compressor, a utility voltage supply 13, a switch 12 switchable in response to the compressor driving signal from the main controlling part 11, a control signal generating part 14 for providing control signals for controlling currents and static capacitances to be supplied to main windings 19 and 21 and supplementary windings 20 and 22 of the compressors 17 and 18 varying with a state of the utility voltage supply 13, and different before and after the starting, a current controlling part 18 for limiting a current of the utility voltage supply 13 in supplying the current to the main windings 19 and 21 in common during starting in response to the control signals and releasing the limiting of the current to be supplied to the main windings after the starting, and a static capacitance controlling part 16 for supplying respective starting static capacitances from the current of the utility voltage supply 13 to the supplementary windings 20 and 22 in succession in starting, and respective operative static capacitances from the current of the utility voltage supply 13 to the supplementary windings 20 and 22 on the same time in starting, and supplying only the respective operative static capacitances from the current of the utility voltage supply 13 to the supplementary windings 20 and 22 in common after the starting, in response to the control signals.

Figure 3:
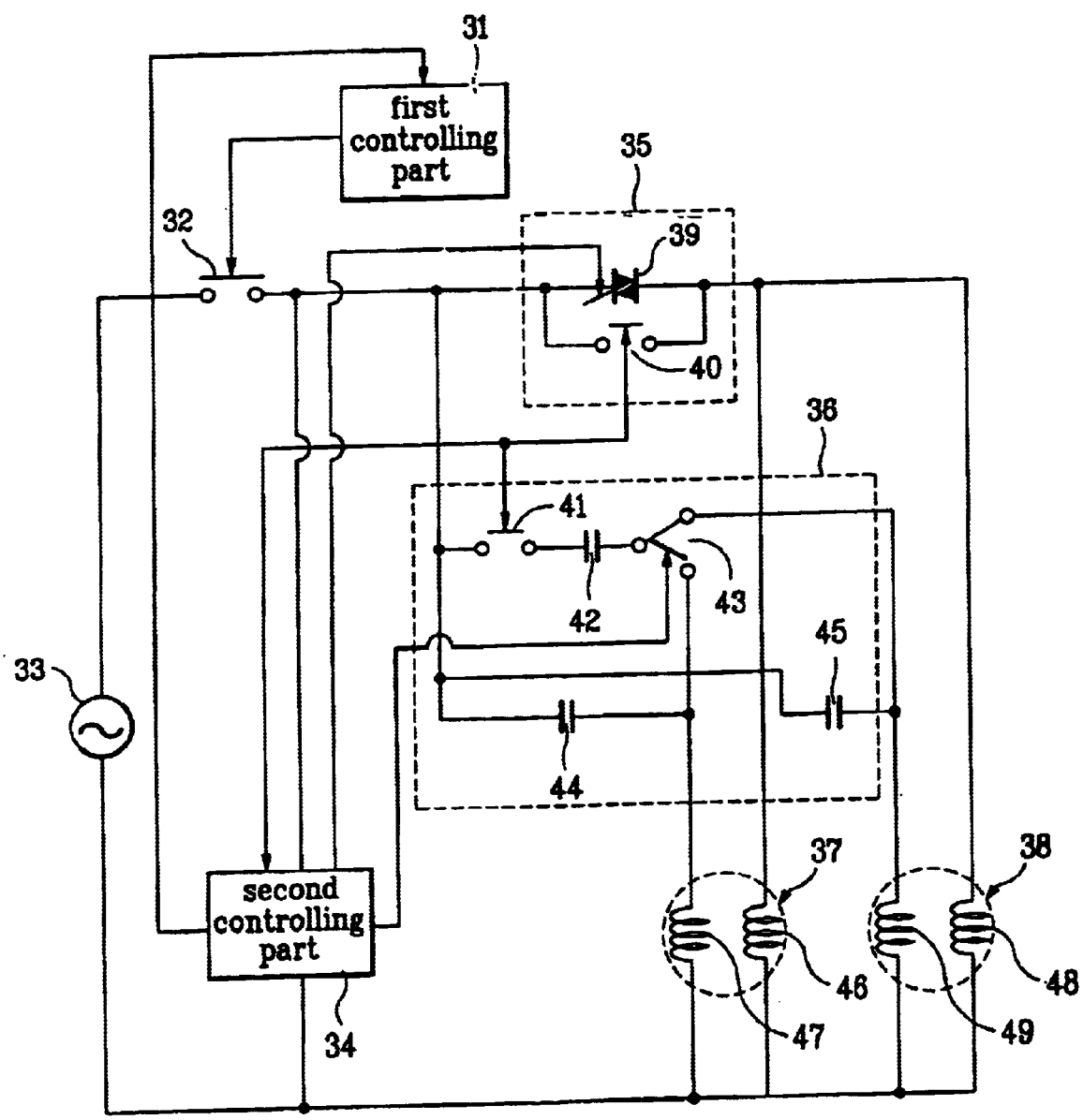
FIG. 3 illustrates a diagram showing a device for controlling supply of current and static capacitance to compressors in accordance with a first preferred embodiment of the present invention.

FIG. 3 illustrates a diagram showing a device for controlling supply of current and static capacitance to compressors in accordance with a first preferred embodiment of the present invention. In the first embodiment device of the present invention, a model for controlling two compressors is considered.

Referring to FIG. 3, the device for controlling supply of current and static capacitance to compressors in accordance with a first preferred embodiment of the present invention includes a utility voltage supply 33, a first controlling part 31 for controlling overall operation of the two compressors 37 and 38, and providing driving turn on/off signals for the compressors 37 and 38 according to a user's selection, a first switch 32 for being switched by the driving turn on/off signals for the compressors 37 and 38 for supplying the utility voltage to the compressors 37 and 38, a second controlling part 34 for providing a phase control signal and a switching control signal varied with a state of a size and a frequency of the utility voltage, and different before and after the starting, a current controlling part 35 having an internal circuit system changeable in response to the switching control signal and controlling a phase of the utility voltage in response to the phase control signal for limiting the current of the utility voltage in supplying the current to the main windings 46 and 48 of the compressor 37 and 38 in common during starting and releasing the limiting of the current after the starting to supply a regular sized current of the utility voltage, and a static capacitance controlling part 36 having an internal circuit changeable in response to the switching control signal for supplying respective starting static capacitances from the current of the utility voltage in a sequence in starting and respective operative static capacitances from the current of the utility voltage to the supplementary windings 47 and 49 of the compressors 37 and 38 on the same time in starting, and supplying only the respective operative static capacitances from the current of the utility voltage to the supplementary windings 47 and 49 after the starting in response to the control signal. The current controlling part 35 supplies a current to the main windings 46 and 48 of the compressors 37 and 38 in common in a direction the current is increased gradually between an initial starting point to a starting completion point in response to the phase control signal and the switching control signal. And, the current controlling part 35 includes a second switch 40 for switching over an output contact point of the first switch 40 and the main windings 46 and 48 in response to the switching control signal, and a phase controlling part 39 connected in parallel to the second switch 31 between an input contact point and an output contact point of the second switch 40 for controlling a phase of the current to be supplied to the main winding 46 and 48 in common depending on a switching on/off state of the second switch 40 and the phase control signal. The static capacitance controlling part 36 includes a third switch 41 having an input contact point connected to an output contact point of the first switch 32 for being switched on/off opposite to the second switch 40 in response to the switching control signal, a starting first capacitor 42 having an input terminal connected to an output contact point of the third switch 41, a fourth switch 43 having an input contact point connected to an output terminal of the starting first capacitor 42, a first output contact point connected to a supplementary winding 47 of the first compressor 37, and a second output contact point connected to the supplementary winding 49 of the second compressor 38 for the input contact point being brought into contact with the contact points of the first and second output contact point in a sequence in response to the switching control signal, an operating second capacitor 44 having an input terminal connected to an output contact point of the first switch 32, and an output terminal connected to the supplementary winding 47 of the first compressor 37, and an operating third capacitor 45 having an input terminal connected to an output contact point of the first switch 32 and an output terminal connected to the supplementary winding 49 of the second compressor 38.

In the meantime, in response to the switching control signal, the second switch 40 in the current controlling part 35 connects the output contact point of the first switch 32 and the main windings 46 and 48 through the phase controlling part 39 in starting, and connects the output contact point of the first switch 32 and the main windings 46 and 48 directly after the starting, thereby changing an internal circuit. The third switch 41 is switched in response to the switching control signal, to change an internal circuit such that an output contact point of the first switch 32 is electrically connected to the starting first capacitor 42 in starting of the compressors 37 and 38, and the output contact point of the first switch 32 is electrically cut off from the first capacitor 42 after the starting. The fourth switch 43 is switched in starting the compressors 37 and 38 such that a starting capacitance of the starting capacitor 42 is supplied to the supplementary winding 47 of the first compressor 37 and the supplementary winding 49 of the second compressor 38 in a sequence in response to the switching control signal from the second controlling part 34. Since the second operating capacitor 44 and the third operating capacitor 45 are always connected to an output contact point of the first switch 32, the supplementary winding 47 of the first compressor 37 and the supplementary winding 49 of the second compressor 38, respective operating capacitances required for the supplementary winding 47 and the supplementary winding 49 are always supplied in starting and after starting of the compressors 37 and 38. Accordingly, as both of the starting static capacitances and the operating static capacitances are supplied to the supplementary windings 47 and 48 of the compressors 37 and 38 in starting, relatively greater static capacitances are provided in the starting in comparison to a time period after starting, and the starting efficiency is improved. The phase controlling part 39 in the current controlling part 35 is a triac driven in response to the phase control signal for controlling a phase of the current supplied to the main windings 46 and 47 in common. The phase controlling part will be called as a triac 39. As explained, the triac 39 as the phase controlling part receives the phase control signal of the second controlling part 34 as a gate voltage thereof for controlling a phase of the current of the utility voltage. In general, the gate voltage is in a pulse form, and has a great duty ratio when the utility voltage is lower than a reference value (for example, 110V or 220V) and a small duty ratio when the utility voltage is higher than the reference value, thereby permitting flow of appropriate current, not overcurrents, to the main windings 46 and 48 of the compressors 37 and 38. Though, when the compressor 37 is in starting as the input contact point of the fourth switch 43 is connected to the first output contact point, the starting first capacitor 42 and the operating second capacitor 44 are connected in parallel to each other by the switching of the third switch 41 for providing the starting torque capacitance to the supplementary winding 47 of the first compressor 37, only the operating second capacitor 44 is used after the starting for supplying the operating static capacitance to the supplementary winding 47. Though not shown in FIG. 3, there may be a transformer for obtaining a desired internal voltage from the utility voltage supply 33, a voltage sensing part for sensing a size of the utility voltage and providing to the second controlling part 34, and a frequency sensing part for sensing a frequency of the utility voltage from the internal voltage provided from the transformer and providing to the second controlling part 34 in FIG. 3, additionally. The second controlling part 34 generates the control signals, i.e., the switching control signal and the phase control signal, varied depending on a size and frequency of the utility voltage sensed through the voltage sensing part and the frequency sensing part, and provides the control signals to the current controlling part 35 and the static capacitance controlling part 36. As explained, if the utility voltage is changed, the phase control signal from the second controlling part 34 is also changed, resulting to flow a constant current to the main windings 46 and 48 since the triac 39 in the current controlling part 35 is operated in response to the changed phase control signal. And, after the compressors 37 and 38 are started, the starting supplementary windings 47 and 49 are provided with operating static capacitances from the current of the utility voltage only, and the main windings 46 and 48 are provided with the current of the regular utility voltage as it is.

The operation of the first embodiment device for controlling supply of current and static capacitance to compressors of the present invention will be explained with reference to FIG. 3.

When the first controlling part 31 generates a compressor driving turn on signal by the user's selection, the first switch 32 is turned on, to close the circuit. Then, if the utility voltage is provided through the utility voltage supply 33, the transformer is provided with internal voltages required for the control device from the utility voltage. Then, the second controlling part 34 in the control device is initialized, such that the voltage sensing part provides a size of the sensed voltage to the second controlling part 34. The frequency sensing part senses the frequency of the utility voltage, and provides to the second controlling part 34. The second controlling part 34 uses the size and the frequency of the utility voltage in determining a state of the utility voltage. Then, the second controlling part 34 generates control signal i.e., a phase control signal and a switching control signal, for providing to the current controlling part 35 and the static capacitance controlling part 36 according to the determined state of the utility voltage. A first switching control signal is generated for determining a starting time at which the utility power is provided to the first starting capacitor 42 in the static capacitance controlling part 36, and a second switching control signal is generated for starting the first compressor 37 and the second compressor 38 in succession, and the first switching control signal is provided to the second switch 40 and the third switch 41, and the second switching control signal is provided to the fourth switch 43. Accordingly, the third switch 41 is turned on and the second switch 40 is turned off in response to the first switching control signal in starting. And, in starting, in response to the second switching control signal, an input contact point of the fourth switch 43 is brought into contact with the first output contact point in a first half of the starting period, and the input contact point of the fourth switch 43 is brought into contact with the second output contact point in a second half of the starting period. And, as explained, the second controlling part 34 provides the phase control signal for controlling the phase of the current of the utility voltage supplied to the main windings 46 and 48 of the compressors 37 and 38. With the phase control signal, the triac 39 is driven, and the current provided to the main windings 46 and 48 is varied. As explained, the phase control signal is a rectangular signal provided to the gate of the triac 39, a duty ratio thereof is fixed based on the size of the utility voltage provided from the voltage sensing part, and an output time point thereof to the current controlling part 35 is fixed based on the frequency value of the utility voltage provided from the frequency sensing part. That is, the phase control signal is started to be supplied to the triac 39 in response to a frequency signal sensed through the frequency sensing part. For example, starting from a time point a signal form the frequency sensing part rises from '0'V to '5V', a timer(not shown) in the second controlling part 34 comes into operation, and the phase control signal of a rectangular form fixed according to the state of the utility voltage is provided to the gate of the triac 39. By the way, the phase control signal provided to the triac 39 is generated by the second controlling part 34 such that a constant current of limited size flows to the main windings 46 and 48 in an initial time period of the starting, a gradually increasing current flows to the main windings 46 and 48 in a middle time period of the starting, and a current of regular size of the utility voltage flows to the main windings 46 and 48 in a final time period of the starting.

It is required that the supplementary windings 47 and 49 of the compressors 37 and 38 are provided with relatively great static capacitances in the starting than after the starting for improving starting characteristics. Therefore, the operating second capacitor 44 and the starting first capacitor 42 are connected in parallel as the third switch 41 is turned on and an input contact point of the fourth switch 43 is brought into contact with the first output contact point, to produce a great starting static capacitance, which is provided to the supplementary winding 47 of the first compressor 37 in starting. Then, the operating third capacitor 45 and the starting first capacitor 42 are connected in parallel as the third switch 41 is turned on and an input contact point of the fourth switch 43 is brought into contact with the second output contact point, to produce a great starting static capacitance, which is provided to the supplementary winding 49 of the second compressor 38 in starting. Upon completion of starting of the two compressors 37 and 38, since the third switch 41 is turned off to leave open, the supplementary winding 47 of the first compressor 37 is provided only with the operating static capacitance from the second capacitor 44 during operation, and the supplementary winding 49 of the second compressor 38 is provided only with the operating static capacitance from the third capacitor 45 during operation. In the meantime, as explained, the phase control signal and the switching control signal for the compressor 38 are determined according to a state of the utility voltage. That is, in a case the utility voltage is lower than a preset overvoltage, turn on time periods of the triac 39 and the third switch 41 are set longer, to start the compressor 38 well even at a low voltage. Opposite to this, in a case the utility voltage is higher than the preset overvoltage, turn on time periods of the triac 39 and the third switch 41 are set shorter, to prevent flow of over current to the main windings 46 and 48.

In the meantime, as explained, if the third switch 41 is turned on and the triac 39 is operated for a preset time period, to complete starting of the compressors 37 and 38, the compressors 37 and 38 are brought into a after start state. After the starting, the third switch 41 is turned off to leave open, the starting static capacitance form the current of the utility voltage supplied to the supplementary windings 47 and 49 through the starting capacitor 42 is cut off. If a preset time period is passed since the third switch 41 is turned off in the after start state, the second switch 40 is turned on, to permit the current of the utility voltage to flow to the main windings 46 and 48 in common through the second switch 40 instead of the triac 39. In this instance, the triac 39 maintains a turned on state for a preset time period even after the third switch 41 is turned off and the second switch 40 is turned on for making stable operation of the device. Thereafter, the current flows to the main windings 46 and 48 only through the second switch 40. Therefore, the current of this time is, not the limited size in the starting, but a regular size of the utility voltage. In the meantime, as shown in FIG. 3, once the first switch 32 is turned off to leave open by the compressor driving turn off signal from the first controlling part 31, as a main controlling part, the utility voltage is supplied to the compressors 37 and 38 no more, and operation of the compressors 37 and 38 are stopped. As explained, the present invention may be applied to an air conditioner using two compressors.

As explained, the first embodiment device for controlling supply of current and static capacitance to compressors of the present invention has the following advantages.

Because a starting time and a size of the phase control signal are controlled according to the utility voltage, and the phase control signal drives the triac, to control a size of the current to be supplied to the main windings, a stable current can always be supplied to the compressors regardless of variation of the utility voltage. And, in the starting, the starting static capacitances from the starting capacitor are provided to the supplementary windings of the first and second compressors in an order of the first and second compressors according to operation of the fourth switch. Therefore, use of the current can be optimized by controlling the current of the utility voltage in starting a plurality of compressors. And, the controlling of current to the plurality of compressors by means of the control device permits to simplify a system of the control device.

Figure 4:
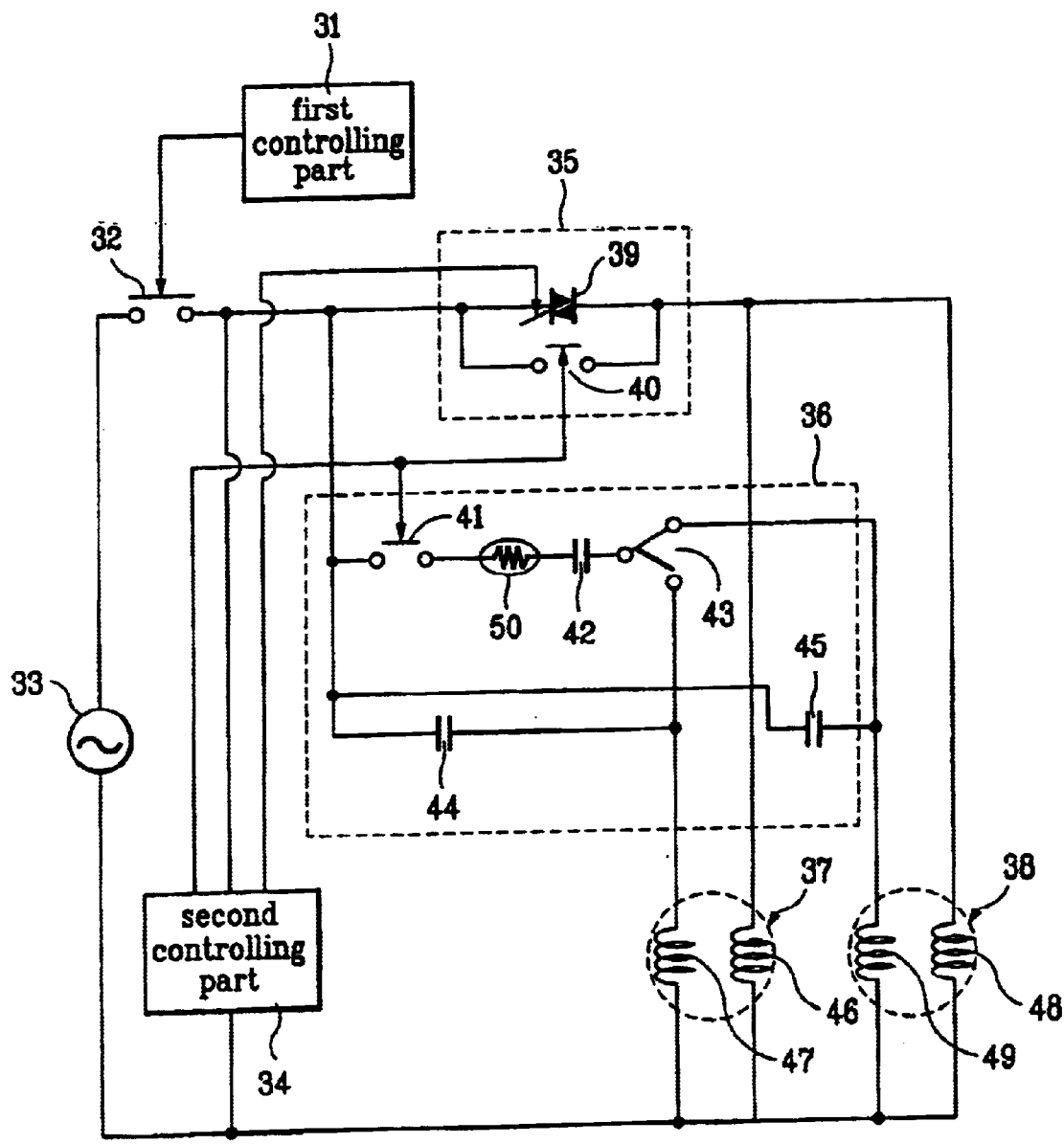
FIG. 4 illustrates a diagram showing a device for controlling supply of current and static capacitance to compressors in accordance with a second preferred embodiment of the present invention.

FIG. 4 illustrates a diagram showing a device for controlling supply of current and static capacitance to compressors in accordance with a second preferred embodiment of the present invention. The device in FIG. 4 has a system identical to the device in FIG. 3 actually except that there is a negative temperature coefficient resister provided between the third switch 41 in the static capacitance controlling part 36 and the starting first capacitor 42.

Referring to FIG. 4, the device for controlling supply of current and static capacitance to compressors in accordance with a second preferred embodiment of the present invention includes a utility voltage supply 33, a first controlling part 31 for controlling overall operation of the two compressors 37 and 38, and providing driving turn on/off signals for the compressors 37 and 38 according to a user's selection, a first switch 32 for being switched by the driving turn on/off signals for the compressors 37 and 38 for supplying the utility voltage to the compressors 37 and 38, a second controlling part 34 for providing a phase control signal and a switching control signal varied with a state of a size and a frequency of the utility voltage, and different before and after the starting, a current controlling part 35 having an internal circuit system changeable in response to the switching control signal and controlling a phase of the utility voltage in response to the phase control signal for limiting the current of the utility voltage in supplying the current to the main windings 46 and 48 of the compressor 37 and 38 in common during starting and releasing the limiting of the current after the starting to supply a regular sized current of the utility voltage, and a static capacitance controlling part 36 having a function for preventing a surge current caused by a momentary discharge having an internal circuit changeable in response to the switching control signal for supplying respective starting static capacitances from the current of the utility voltage in a sequence in starting and respective operative static capacitances from the current of the utility voltage to the supplementary windings 47 and 49 of the compressors 37 and 38 on the same time in starting, and supplying only the respective operative static capacitances from the current of the utility voltage to the supplementary windings 47 and 49 after the starting in response to the control signal. The current controlling part 35 supplies a current to the main windings 46 and 48 of the compressors 37 and 38 in common in a direction the current is increased gradually between an initial starting point to a starting completion point in response to the phase control signal and the switching control signal. And, the current controlling part 35 includes a second switch 40 for switching over an output contact point of the first switch 40 and the main windings 46 and 48 in response to the switching control signal, and a phase controlling part 39 connected in parallel to the second switch 31 between input contact point and an output contact point of the second switch 40 for controlling a phase of the current to be supplied to the main winding 46 and 48 in common depending on a switching on/off state of the second switch 40 and the phase control signal. The static capacitance controlling part 36 includes a third switch 41 having an input contact point connected to an output contact point of the first switch 32 for being switched on/off in response to the switching control signal, a negative temperature coefficient resister 50 having a first terminal connected to an output contact point of the third switch 41, a starting first capacitor 42 having a first terminal connected to a second terminal of the negative temperature coefficient resister 50, a fourth switch 43 having an input contact point connected to a second terminal of the starting first capacitor 42, a first output contact point connected to a supplementary winding 47 of the first compressor 37, and a second output contact point connected to the supplementary winding 49 of the second compressor 38 for the input contact point being brought into contact with the contact points of the first and second output contact point in a sequence in response to the switching control signal, an operating second capacitor 44 having a first terminal connected to an output contact point of the first switch 32, and a second terminal connected to the supplementary winding 47 of the first compressor 37, and an operating third capacitor 45 having a first terminal connected to an output contact point of the first switch 32 and a second terminal connected to the supplementary winding 49 of the second compressor 38.

The negative temperature coefficient resister 51, provided between the third switch 41 and the starting first capacitor 42, prevents seizure of the third switch 41, by preventing flow of a surge current to the third switch 41 caused by a momentary discharge between the starting first capacitor 42, the operating second capacitor 44 and the third operating capacitor 45 at an initial starting of the compressors 37 and 38. In other words, for a few seconds before the triac 39 is turned on, charges in the operating second capacitor 44, the operating third capacitor 45, and the starting first capacitor 42 may flow to the supplementary windings 47 and 48 together as a surge current. The surge current may be generated by a momentary discharge when the third switch 41 is turned on for using the starting first capacitor 42. However, as the negative temperature coefficient resister 50 is provided among the starting first capacitor 42, the operating second capacitor 44, and the operating third capacitor 45, the seizure of the third switch 41 caused by the surge current can be prevented. In view of characteristics of the negative temperature coefficient resister 50, the negative temperature coefficient resister 50 has a great initial resistance, which drops the lower as a temperature thereof rises the higher as the negative temperature coefficient resister 50 is heated. The great initial resistance prevents damage of the third switch 41 caused by the surge current.

The operation of the second embodiment device of the present invention will be omitted as the operation is the same with the first embodiment except the portion for the negative temperature coefficient resister.

In addition to the advantages of the first embodiment device, the second embodiment device of the present invention has the following additional advantages. The second embodiment device has the negative temperature coefficient resister provided among the starting first capacitor, the operating second capacitor, and the operating third capacitor, which has a resistance varied with a temperature. Therefore, at the moment the triac is turned on in an initial starting, occurrence of a surge current among the starting capacitor and the operating capacitors is prevented, and seizure of switches in the vicinity thereof, or damage to the starting capacitor can be prevented.

Figure 5:
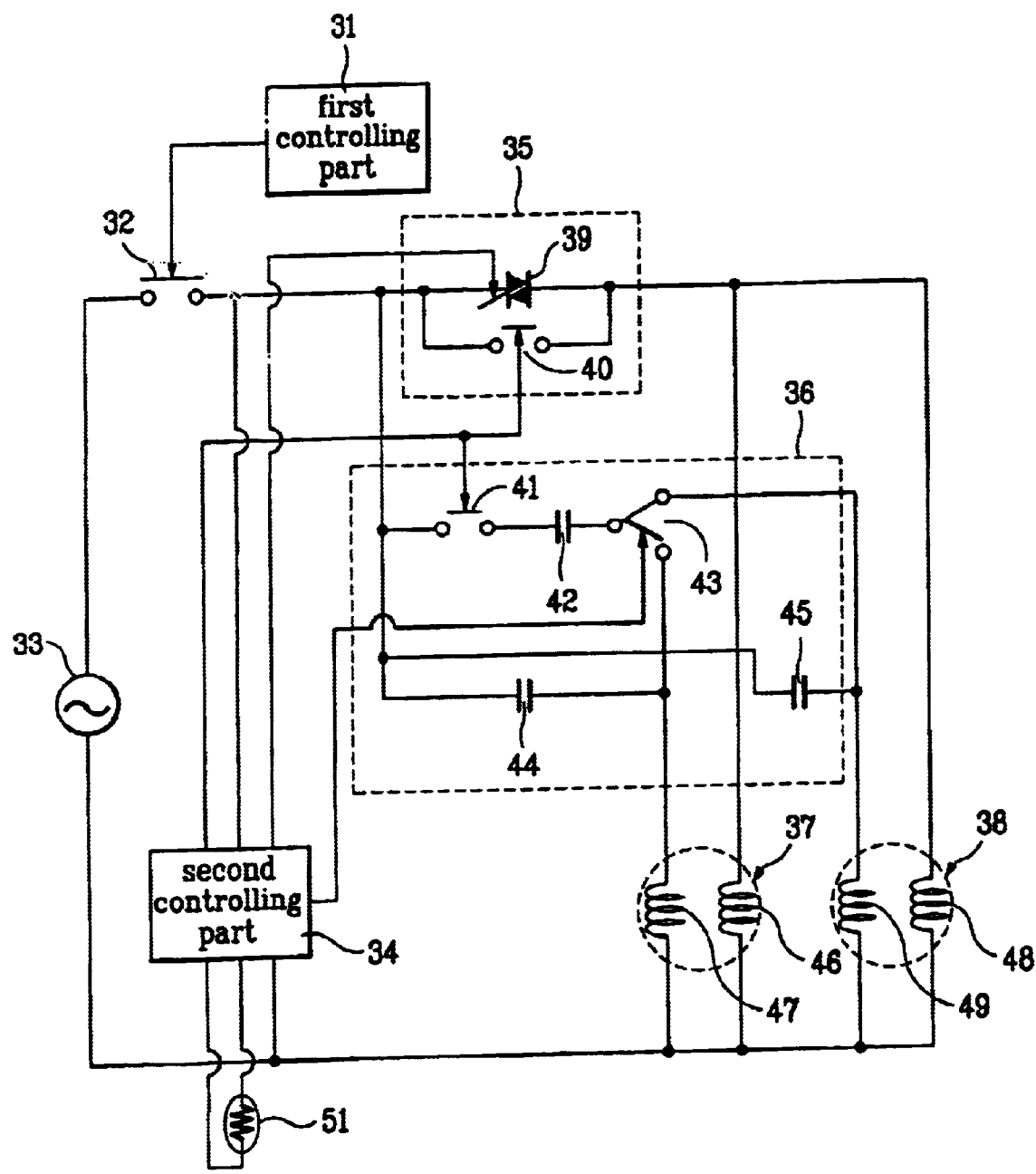
FIG. 5 illustrates a diagram showing a device for controlling supply of current and static capacitance to compressors in accordance with a third preferred embodiment of the present invention.

FIG. 5 illustrates a diagram showing a device for controlling supply of current and static capacitance to compressors in accordance with a third preferred embodiment of the present invention. The device in FIG. 5 has a system identical to the first embodiment device except that there is an external temperature sensing part 51 for providing an external temperature to the second controlling part. Accordingly, only a system of the third embodiment device and a function of the external temperature sensing part will be explained, briefly.

Referring to FIG. 5, the device for controlling supply of current and static capacitance to compressors in accordance with a third preferred embodiment of the present invention includes a utility voltage supply 33, a first controlling part 31 for controlling overall operation of the two compressors 37 and 38, and providing driving turn on/off signals for the compressors 37 and 38 according to a user's selection, a first switch 32 for being switched by the driving turn on/off signals for the compressors 37 and 38 for supplying, or cutting off the supply of the utility voltage to the compressors 37 and 38, an external temperature sensing part 51 for sensing an external temperature of the compressors 37 and 38, a second controlling part 34 for providing a phase control signal and a switching control signal varied with a state of a size and a frequency of the utility voltage and the sensed external temperature, and different before and after the starting, a current controlling part 35 having an internal circuit system changeable in response to the switching control signal and controlling a phase of the utility voltage in response to the phase control signal for limiting the current of the utility voltage in supplying the current to the main windings 46 and 48 of the compressor 37 and 38 in common during starting and releasing the limiting of the current after the starting to supply a regular sized current of the utility voltage, and a static capacitance controlling part 36 having an internal circuit changeable in response to the switching control signal for supplying respective starting static capacitances from the current of the utility voltage in a sequence in starting and respective operative static capacitances from the current of the utility voltage to the supplementary windings 47 and 49 of the compressors 37 and 38 on the same time in starting, and supplying only the respective operative static capacitances from the current of the utility voltage to the supplementary windings 47 and 49 after the starting in response to the control signal. The current controlling part 35 supplies a current to the main windings 46 and 48 of the compressors 37 and 38 in common in a direction the current is increased gradually between an initial starting point to a starting completion point in response to the phase control signal and the switching control signal. And, the current controlling part 35 includes a second switch 40 for switching over an output contact point of the first switch 40 and the main windings 46 and 48 in response to the switching control signal, and a phase controlling part 39 connected in parallel to the second switch 31 between an input contact point and an output contact point of the second switch 40 for controlling a phase of the current to be supplied to the main winding 46 and 48 in common depending on a switching on/off state of the second switch 40 and the phase control signal. The static capacitance controlling part 36 includes a third switch 41 having an input contact point connected to an output contact point of the first switch 32 for being switched on/off opposite to the second switch 40 in response to the switching control signal, a starting first capacitor 42 having a first terminal connected to an output contact point of the third switch 41, a fourth switch 43 having an input contact point connected to a second terminal of the starting first capacitor 42, a first output contact point connected to a supplementary winding 47 of the first compressor 37, and a second output contact point connected to the supplementary winding 49 of the second compressor 38 for the input contact point being brought into contact with the contact points of the first and second output contact point in a sequence in response to the switching control signal, an operating second capacitor 44 having a first terminal connected to an output contact point of the first switch 32, and a second terminal connected to the supplementary winding 47 of the first compressor 37, and an operating third capacitor 45 having a first terminal connected to an output contact point of the first switch 32 and a second terminal connected to the supplementary winding 49 of the second compressor 38. The external temperature sensing part 51 may be a thermistor.

In the meantime, the temperature sensing part 51 senses an external temperature of the compressors 37 and 38, and provides to the second controlling part 34. Then, the second controlling part 34 generates a phase control signal and a switching control signal for providing to the current controlling part 35 and the static capacitance controlling part 36 according to the sensed state of the utility voltage and the external temperature. And, for controlling the phase of the current of the utility voltage supplied to the main windings 46 and 48 of the compressors 37 and 38, the second controlling part 34 provides the phase control signal, which may vary with the temperature value received from the temperature sensing part 51. That is, the second controlling part 34 compares the external temperature measured presently and a preset reference temperature, to find a season pertinent to the present external temperature and provide phase control signals consistent to the season. The phase control signal is provided to a gate of the triac 39 in forms of pulses. For example, in a case the external temperature is higher than T1 set as a reference temperature for summer, a pulse width of the phase control signal provided to the triac 39 is set to P3 of summer, in a case the external temperature is below T3 set as a reference temperature for winter, a pulse width of the phase control signal is set to P1 of winter, and, if the external temperature is n between T1 and T3 set as a reference temperature for spring and fall, a pulse width of the phase control signal is set to P2 of spring and fall. For reference, in starting the compressors 37 and 38, the pulse width of the phase control signal is required to be large if the external temperature is low because the low external temperature leads a viscosity of the refrigerant poor to restrict a compressor motor substantially. Therefore, P1 has the largest pulse width, P2 has a next large pulse width, and P3 has the smallest pulse width. In this instance, it is considered that the state of the utility voltage is regular. According to the phase control signal set with respective to a season, the triac 39 is driven, and a current provided to the main windings 46 and 48 is varied. As explained, the phase control signal is a rectangular signal provided to the gate of the triac 39, a duty ratio thereof is fixed, not only based on the external temperature, but also based on a size of the utility voltage sensed already, and an output time point thereof is fixed based on the frequency value of the utility voltage.

As has been explained, the third embodiment device of the present invention can optimize starting of the compressors since the phase control signal provided to the triac can be varied with seasons, appropriately. And, a starting current can be used efficiently because the static capacitance controlling part starts the first compressor at first, and then the second compressor in starting.

Figure 6:
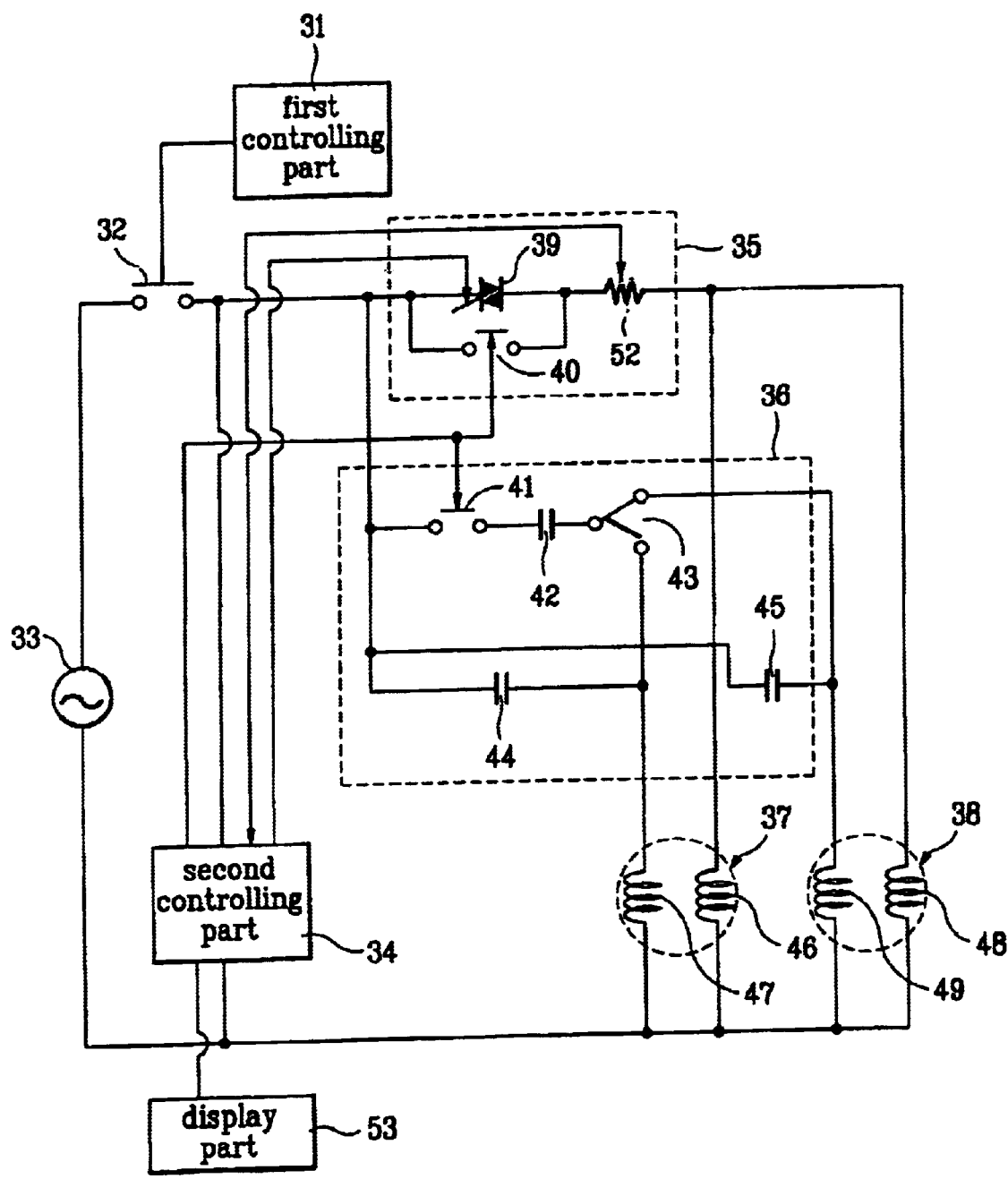
FIG. 6 illustrates a diagram showing a device for controlling supply of current and static capacitance to compressors in accordance with a fourth preferred embodiment of the present invention.

FIG. 6 illustrates a diagram showing a device for controlling supply of current and static capacitance to compressors in accordance with a fourth preferred embodiment of the present invention. The device in FIG. 6 has a system identical to the first embodiment device except that there are a current detecting part 52 for detecting a current to the main windings 46 and 48 of the compressors 37 and 38 and providing to the second controlling part 34 in starting, and a display part 53 for displaying a state of a detected current in response to a display signal from the second controlling part 34, to inform to a user. Accordingly, only a system of the fourth embodiment device and the current detecting part 52 and the display part 53 will be explained, briefly.

Referring to FIG. 6, the device for controlling supply of current and static capacitance to compressors in accordance with a fourth preferred embodiment of the present invention includes a utility voltage supply 33, a first controlling part 31 for controlling overall operation of the two compressors 37 and 38, and providing driving turn on/off signals for the compressors 37 and 38 according to a user's selection, a first switch 32 for being switched by the driving turn on/off signals for the compressors 37 and 38 for supplying, or cutting off the supply of the utility voltage to the compressors 37 and 38, a current detecting part 52 for detecting currents to the main windings 46 and 48 of the compressors 37 and 38 and providing to the second controlling part 34, a second controlling part 34 for providing a phase control signal and a switching control signal varied with a state of a size and a frequency of the utility voltage, and different before and after the starting, and a display signal for displaying the state of current to the main windings 46 and 48 detected at starting, a current controlling part 35 having an internal circuit system changeable in response to the switching control signal and controlling a phase of the utility voltage in response to the phase control signal for limiting the current of the utility voltage in supplying the current to the main windings 46 and 48 of the compressor 37 and 38 in common during starting and releasing the limiting of the current after the starting to supply a regular sized current of the utility voltage, a display part 53 for displaying the state of the detected current to outside of the device in response to the display signal, and a static capacitance controlling part 36 having an internal circuit changeable in response to the switching control signal for supplying respective starting static capacitances from the current of the utility voltage in a sequence in starting and respective operative static capacitances from the current of the utility voltage to the supplementary windings 47 and 49 of the compressors 37 and 38 on the same time in starting, and supplying only the respective operative static capacitances from the current of the utility voltage to the supplementary windings 47 and 49 after the starting in response to the control signal. The current controlling part 35 supplies a current to the main windings 46 and 48 of the compressors 37 and 38 in common in a direction the current is increased gradually between an initial starting point to a starting completion point in response to the phase control signal and the switching control signal. And, the current controlling part 35 includes a second switch 40 for switching over an output contact point of the first switch 40 and the main windings 46 and 48 in response to the switching control signal, and a phase controlling part 39 connected in parallel to the second switch 31 between an input contact point and an output contact point of the second switch 40 for controlling a phase of the current to be supplied to the main winding 46 and 48 in common depending on a switching on/off state of the second switch 40 and the phase control signal. The static capacitance controlling part 36 includes a third switch 41 having an input contact point connected to an output contact point of the first switch 32 for being switched on/off in response to the switching control signal, a starting first capacitor 42 having a first terminal connected to an output contact point of the third switch 41, a fourth switch 43 having an input contact point connected to a second terminal of the starting first capacitor 42, a first output contact point connected to a supplementary winding 47 of the first compressor 37, and a second output contact point connected to the supplementary winding 49 of the second compressor 38 for the input contact point being brought into contact with the contact points of the first and second output contact point in a sequence in response to the switching control signal, an operating second capacitor 44 having a first terminal connected to an output contact point of the first switch 32, and a second terminal connected to the supplementary winding 47 of the first compressor 37, and an operating third capacitor 45 having a first terminal connected to an output contact point of the first switch 32 and a second terminal connected to the supplementary winding 49 of the second compressor 38. In FIG. 6, the current detecting part 52 may be a resistor, and the display part 53 may be an LED(Light Emitting Diode).

And, the second controlling part 34 provides the display signal for informing a state of the present current to the main windings 46 and 48 of the compressors 37 and 38 in starting. As explained, the display signal may vary with a current value flowing to the main windings 46 and 48 in the starting. That is, the second controlling part 34 compares the measured present current value to the main windings 46 and 48 and a preset reference overcurrent, to find a state of the present current value and provide a phase control signal consistent to the state. For example, in a case the current to the main windings 46 and 48 is greater than the preset first overcurrent, the LED 53 is made to flash to give alarm to the user, if the detected current is lower than the preset first overcurrent and higher than a preset second overcurrent, the LED 53 is turned on so that the user can make a service call, and in a case the detected current to the main windings 46 and 48 is lower than the preset second overcurrent, the second controlling part 34, assuming that it as a regular state, turns off the LED. This display method may be replaced with other method.

As has been explained, the fourth embodiment device of the present invention can make the user to know that there is an overcurrent flowing to the main windings since the current to the main windings is sensed always and displayed outside of the device. And, a starting current can be used efficiently because the static capacitance controlling part starts the first compressor at first, and then the second compressor.

Figure 7:
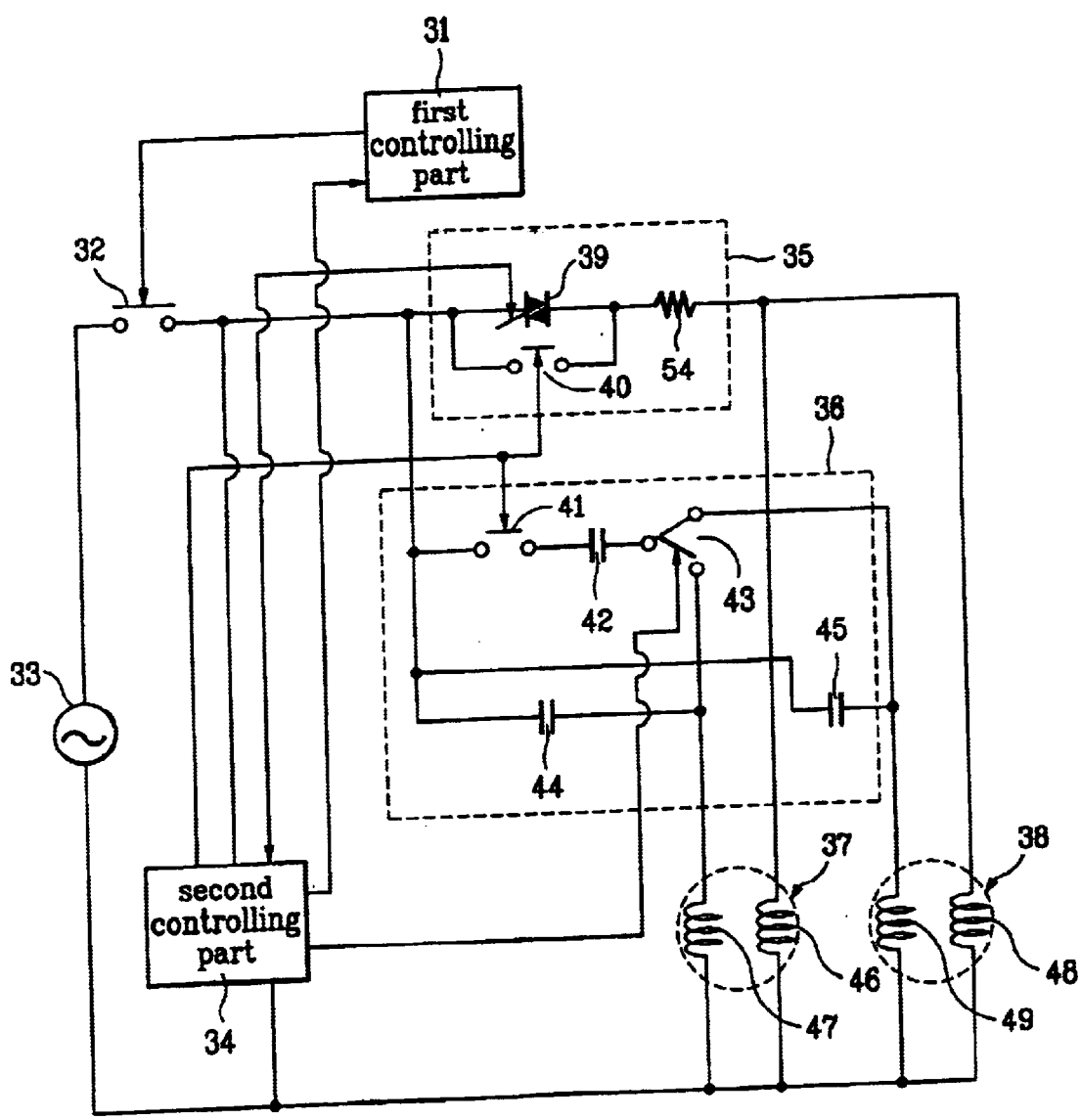
FIG. 7 illustrates a diagram showing a device for controlling supply of current and static capacitance to compressors in accordance with a fifth preferred embodiment of the present invention.

FIG. 7 illustrates a diagram showing a device for controlling supply of current and static capacitance to compressors in accordance with a fifth preferred embodiment of the present invention.

Referring to FIG. 7, the device for controlling supply of current and static capacitance to compressors in accordance with a fifth preferred embodiment of the present invention includes a utility voltage supply 33, a first controlling part 31 for controlling overall operation of the two compressors 37 and 38, and providing driving turn on/off signals for the compressors 37 and 38 according to a user's selection, a first switch 32 for being switched by the driving turn on/off signals for the compressors 37 and 38 for supplying the utility voltage to the compressors 37 and 38, a current detecting part 54 for detecting currents to the main windings 46 and 48 of the compressors 37 at starting, a second controlling part 34 for providing a phase control signal and a switching control signal varied with a state of a size and a frequency of the utility voltage, and different before and after the starting, a current controlling part 35 having an internal circuit system changeable in response to the switching control signal and controlling a phase of the utility voltage in response to the phase control signal for limiting the current of the utility voltage in supplying the current to the main windings 46 and 48 of the compressor 37 and 38 in common during starting and releasing the limiting of the current after the starting to supply a regular sized current of the utility voltage, and a static capacitance controlling part 36 having an internal circuit changeable in response to the switching control signal for supplying respective starting static capacitances from the current of the utility voltage in a sequence in starting and respective operative static capacitances from the current of the utility voltage to the supplementary windings 47 and 49 of the compressors 37 and 38 on the same time in starting, and supplying only the respective operative static capacitances from the current of the utility voltage to the supplementary windings 47 and 49 after the starting in response to the control signal. In FIG. 7, the current detecting part may be a resistor. The current controlling part 35 supplies a current to the main windings 46 and 48 of the compressors 37 and 38 in common in a direction the current is increased gradually between an initial starting point to a starting completion point in response to the phase control signal and the switching control signal. And, the current controlling part 35 includes a second switch 40 for switching over an output contact point of the first switch 40 and the main windings 46 and 48 in response to the switching control signal, and a phase controlling part 39 connected in parallel to the second switch 31 between an input contact point and an output contact point of the second switch 40 for controlling a phase of the current to be supplied to the main winding 46 and 48 in common depending on a switching on/off state of the second switch 40 and the phase control signal. The static capacitance controlling part 36 includes a third switch 41 having an input contact point connected to an output contact point of the first switch 32 for being switched on/off in response to the switching control signal, a starting first capacitor 42 having an input terminal connected to an output contact point of the third switch 41, a fourth switch 43 having an input contact point connected to an output terminal of the starting first capacitor 42, a first output contact point connected to a supplementary winding 47 of the first compressor 37, and a second output contact point connected to the supplementary winding 49 of the second compressor 38 for the input contact point being brought into contact with the contact points of the first and second output contact point in a sequence in response to the switching control signal, a first operating capacitor 44 having an input terminal connected to an output contact point of the first switch 32, and an output terminal connected to the supplementary winding 47 of the first compressor 37, and a second operating capacitor 45 having an input terminal connected to an output contact point of the first switch 32 and an output terminal connected to the supplementary winding 49 of the second compressor 38.

In the meantime, when the current detecting part 54 senses the current to the main windings 46 and 48 and provides to the second controlling part 34, the second controlling part 34 provides a starting voltage value at the main windings 46 and 48 by multiplying the present current value to the main windings 46 and 48 of the compressors 37 and 59 and a resistance of the current detecting part 54(hereafter called as a resistor 54). The phase control signal may vary with the measured current to the main windings 46 and 48 presently, i.e., the starting voltage value. That is, the second controlling part 34 compares the measured present starting voltage value to a preset reference overvoltages, to find a state of the present current value to the main windings 46 and 48 and vary the phase control signal consistent to the state. For example, in a case the current to the main windings 46 and 48 is greater than the preset first overcurrent, the second controlling part 34 informs the fact to the first controlling part 31 so that the first controlling part 31 knows that the compressors 37 and 38 is in a critical state. Then, the first controlling part 31 applies a driving turn off signal to the first switch 32, to turn off, to open the first switch 32. Accordingly, the utility voltage will be supplied to the compressor no more, and the compressors 37 and 38 stops the operation. In a case the detected current to the main windings 46 and 48 is lower than the preset first overcurrent and greater than the preset second overcurrent, assuming that an overcurrent flows to the main windings 46 and 48, the second controlling part 34 reduces a width of the phase control signal applied to the gate of the triac 39 in a form of pulse. And, in a case the detected current to the main windings 46 and 48 is lower than the preset second overcurrent, assuming that it as a regular state, the second controlling part 34 maintains an initial phase control value as it is and provides to the triac 39. This phase control signal varying method may be replaced with other method.

As has been explained, the fifth embodiment device of the present invention can always provide a stable starting current to the main windings by appropriately varying the phase controlling signal and providing to the triac at the second controlling part according to variations of current to the main windings in starting.

Figure 8:
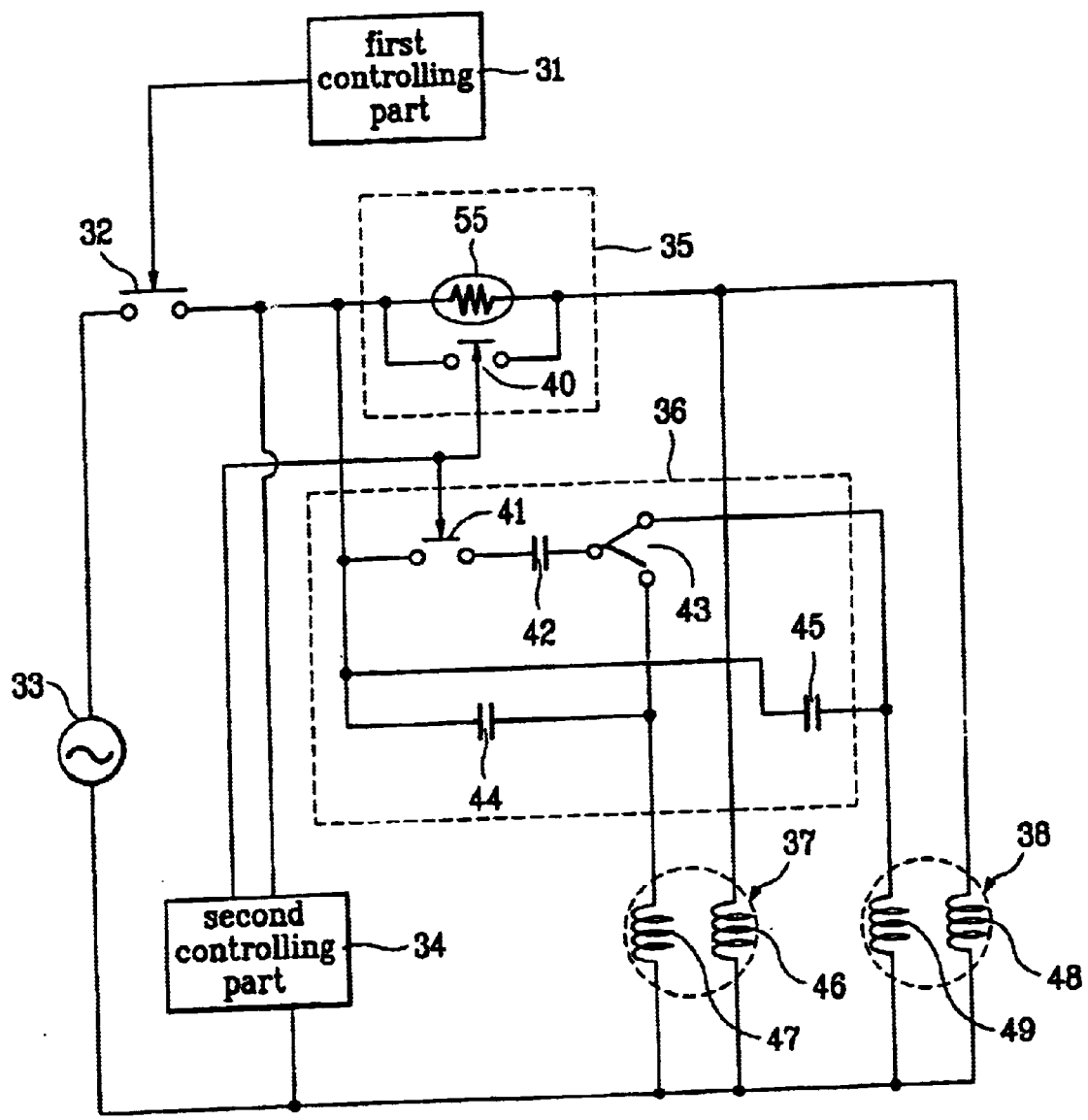
FIG. 8 illustrates a diagram showing a device for controlling supply of current and static capacitance to compressor in accordance with a sixth preferred embodiment of the present invention.

FIG. 8 illustrates a diagram showing a device for controlling supply of current and static capacitance to compressors in accordance with a sixth preferred embodiment of the present invention.

Referring to FIG. 8, the device for controlling supply of current and static capacitance to compressors in accordance with a sixth preferred embodiment of the present invention includes a utility voltage supply 33, a first controlling part 31 for controlling overall operation of the two compressors 37 and 38, and providing driving turn on/off signals for the compressors 37 and 38 according to a user's selection, a first switch 32 for being switched by the driving turn on/off signals for the compressors 37 and 38 for supplying the utility voltage to the compressors 37 and 38, a second controlling part 34 for providing a switching control signal varied with a state(a size and a frequency) of the utility voltage, a current controlling part 35 having an internal circuit system changeable in response to the switching control signal for limiting the current of the utility voltage in supplying the current to the main windings 46 and 48 of the compressor 37 and 38 in common during starting and releasing the limiting of the current after the starting to supply a regular sized current of the utility voltage, and a static capacitance controlling part 36 having an internal circuit changeable in response to the switching control signal for supplying respective starting static capacitances from the current of the utility voltage in a sequence in starting and respective operative static capacitances from the current of the utility voltage to the supplementary windings 47 and 49 of the compressors 37 and 38 on the same time in starting, and supplying only the respective operative static capacitances from the current of the utility voltage to the supplementary windings 47 and 49 after the starting in response to the control signal. The current controlling part 35 supplies the current to the main windings 46 and 48 of the compressors 37 and 38 in common in a direction the current is increased gradually between an initial starting point to a starting completion point in response to the switching control signal. And, the current controlling part 35 includes a second switch 40 for switching over an output contact point of the first switch 40 and the main windings 46 and 48 in response to the switching control signal, and a negative temperature coefficient resister 55 connected in parallel to the second switch 31 between an input contact point and an output contact point of the second switch 40 for controlling the current to be supplied to the main winding 46 and 48 in common depending on a switching on/off state of the second switch 40. The static capacitance controlling part 36 includes a third switch 41 having an input contact point connected to an output contact point of the first switch 32 for being switched on/off in response to the switching control signal, a starting first capacitor 42 having an input terminal connected to an output contact point of the third switch 41, a fourth switch 43 having an input contact point connected to an output terminal of the starting first capacitor 42, a first output contact point connected to a supplementary winding 47 of the first compressor 37, and a second output contact point connected to the supplementary winding 49 of the second compressor 38 for the input contact point being brought into contact with the contact points of the first and second output contact point in a sequence in response to the switching control signal, an operating second capacitor 44 having an input terminal connected to an output contact point of the first switch 32, and an output terminal connected to the supplementary winding 47 of the first compressor 37, and an operating third capacitor 45 having an input terminal connected to an output contact point of the first switch 32 and an output terminal connected to the supplementary winding 49 of the second compressor 38. That is, the phase controlling part 39 in the first embodiment may be the negative temperature coefficient resister 55 in this embodiment.

In the meantime, as shown in FIG. 8, in an initial starting, if the second switch 40 is turned off to leave open and the negative temperature coefficient resister 55 is provided with the utility voltage, the negative temperature coefficient resister 55 limits the utility voltage thereby preventing an overcurrent from flowing to the main windings 46 and 48 of the compressors 37 and 38. The negative temperature coefficient resister 55 has an adequate initial resistance such that a starting current supplied to the main windings 46 and 48 in the starting of the compressor not to exceed a preset reference starting current. That is, since the negative temperature coefficient resister 55 has the greatest initial resistance value and a resistance component that becomes the smaller, as the temperature thereof becomes the higher, the negative temperature coefficient resister 55 limits the starting current to the main windings 46 and 48 of the compressors 37 and 38 by means of the initial resistance. In continuation, if a current for the utility voltage is supplied to the negative temperature coefficient resister 55, the negative temperature coefficient resister itself generates heat to reduce the initial resistance, sharply. Then, upon completion of the starting after a while, the switching control signal turns on the second switch 40, to cut off the circuit, such that the current of the utility voltage flows to the main windings 46 and 48 through the second switch 40 in a regular size without passing through the negative temperature coefficient resister 55.

As has been explained, the sixth embodiment device of the present invention can prevent an overcurrent from flowing to the main windings by supplying a current limited by the negative temperature coefficient resister having a resistance reversely proportional to a temperature thereof in starting, and, not only enhance a starting current, but also simplify a system of the control device since one control device can start the fist compressor at first and the second compressor next.

Figure 9:
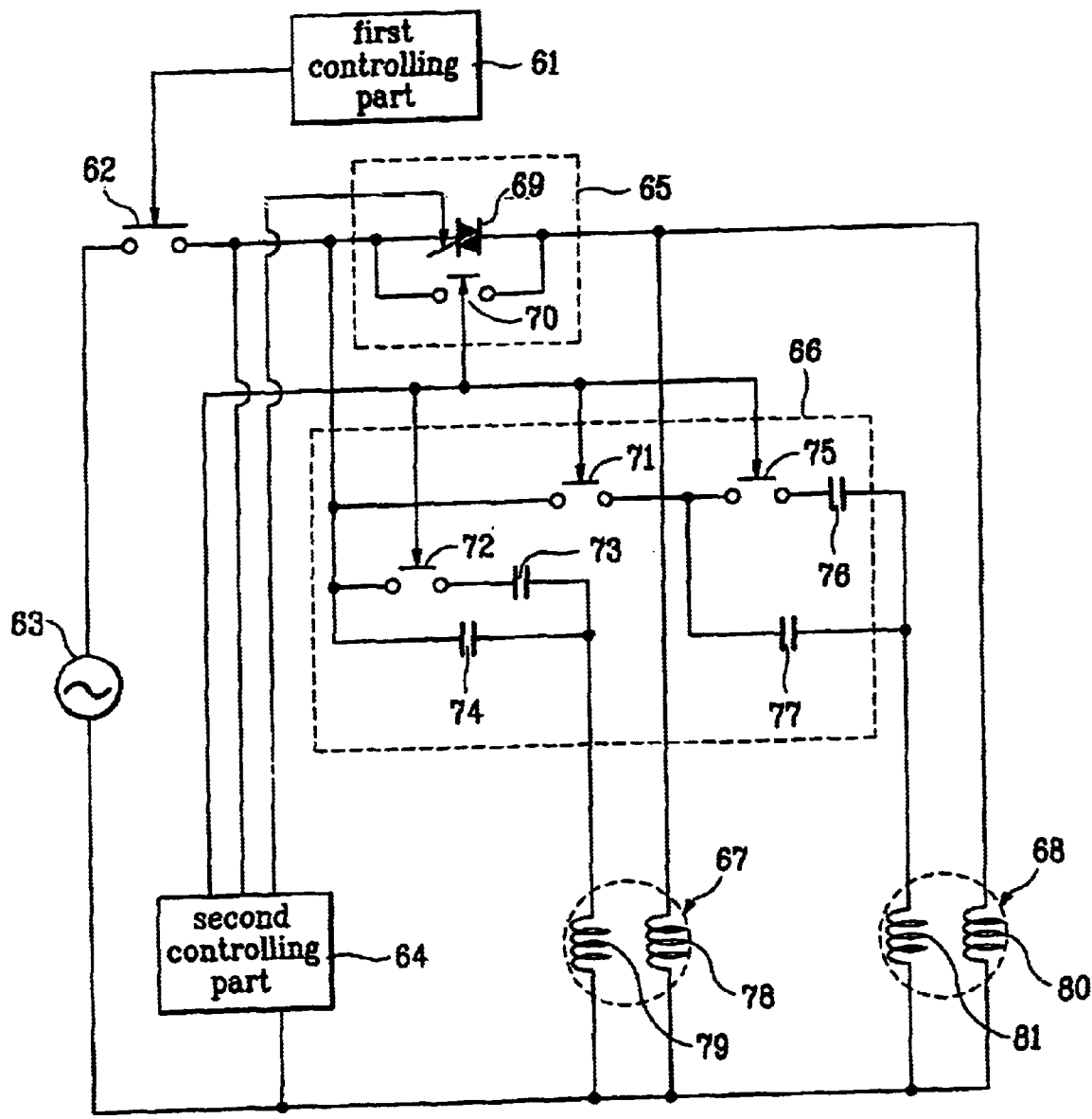
FIG. 9 illustrates a diagram showing a device for controlling supply of current and static capacitance to compressors in accordance with a seventh preferred embodiment of the present invention.

FIG. 9 illustrates a diagram showing a device for controlling supply of current and static capacitance to compressors in accordance with a seventh preferred embodiment of the present invention. In the seventh embodiment device of the present invention, a model for controlling two compressors is considered.

Referring to FIG. 9, the device for controlling supply of current and static capacitance to compressors in accordance with a seventh preferred embodiment of the present invention includes a utility voltage supply 63, a first controlling part 61 for controlling overall operation of the two compressors 67 and 68, and providing driving turn on/off signals for the compressors 67 and 68 according to a user's selection, a first switch 62 for being switched by the driving turn on/off signals for the compressors 67 and 68 for supplying the utility voltage to the compressors 67 and 68, a second controlling part 64 for providing a phase control signal and a switching control signal varied with a state of a size and a frequency of the utility voltage, and different before and after the starting, a current controlling part 65 having an internal circuit system changeable in response to the switching control signal and controlling a phase of the current of the utility voltage in response to the phase control signal for limiting the current of the utility voltage in supplying the current to the main windings 78 and 80 of the compressor 67 and 68 in common during starting and releasing the limiting of the current after the starting to supply a regular sized current of the utility voltage, and a static capacitance controlling part 66 having an internal circuit changeable in response to the switching control signal for supplying respective starting static capacitances from the current of the utility voltage in a sequence in starting and respective operative static capacitances from the current of the utility voltage to the supplementary windings 79 and 81 of the compressors 67 and 68 on the same time in starting, and supplying only the respective operative static capacitances from the current of the utility voltage to the supplementary windings 79 and 81 after the starting in response to the control signal. The current controlling part 65 supplies a current to the main windings 78 and 80 of the compressors 67 and 68 in common in a direction the current is increased gradually between an initial starting point to a starting completion point in response to the phase control signal and the switching control signal. And, the current controlling part 65 includes a second switch 70 for switching over an output contact point of the first switch 70 and the main windings 78 and 80 in response to the switching control signal, and a phase controlling part 69 connected in parallel to the second switch 61 between an input contact point and an output contact point of the second switch 70 for controlling a phase of the current to be supplied to the main winding 78 and 80 in common depending on a switching on/off state of the second switch 70 and the phase control signal. The static capacitance controlling part 66 includes a third switch 72 having an input contact point connected to an output contact point of the first switch 62 for being switched on/off in response to the switching control signal, a starting first capacitor 73 having a first terminal connected to an output contact point of the third switch 72 and a second terminal connected to the supplementary winding 79 of the first compressor 67, a first operating capacitor 74 having a first terminal connected to an output contact point of the first switch 62, and a second terminal connected both to the second terminal of the first capacitor 73 and the supplementary winding 79 of the first compressor 67, a fourth switch 71 having an input contact point connected to an output contact point of the first switch 62, a fifth switch 71 having an input contact point connected to an output contact point of the fourth switch 71, a second starting capacitor 76 having a first terminal connected to an output contact point of the fifth switch 75 and a second terminal connected to the supplementary winding 81 of the second compressor 68, and a second operating capacitor 77 having a first terminal connected both to an output contact point of the fourth switch 71 and an input contact point of the fifth switch 75 and a second terminal connected both to a second terminal of the second starting capacitor 76 and the supplementary winding 81 of the second compressor 68.

The second switch 70 in the current controlling part 65, and the third switch 72, the fourth switch 71, and the fifth switch 75 in the static capacitance controlling part 66 are switch on/off in the following order so that the first compressor 67 and the second compressor 68 put into operation in a sequence.

In a first half of starting of the compressors 67 and 68, the second switch 70 is turned off (opened), the third switch 72 is turned on(closed), the fourth switch 71 is turned off, and the fifth switch 75 is turned off. And, in a second half of the starting of the compressors 67 and 68, the second switch 70 is turned off (opened), the third switch 72 is tuned off, the fourth switch 71 is turned on, and the fifth switch 75 is turned off. According to the foregoing switching operations of the switches 70, 71, 72, and 75, the first compressor 67 is started at first, and, then, the second compressor 68 is started. Thereafter, the first and second compressors 67 and 68 are operated together until the first controlling part provides a driving turn off signal thereto. In detail, in response to the switching control signal, the second switch 70 in the current controlling part 65 connects the output contact point of the first switch 62 and the main windings 78 and 80 through the phase controlling part 69(hereafter called as a triac 69) in starting, and connects the output contact point of the first switch 62 and the main windings 78 and 80 directly after the starting, thereby changing an internal circuit. The third switch 72 is switched in response to the switching control signal, to change an internal circuit such that an output contact point of the first switch 62 is electrically connected to the first starting capacitor 73 in starting of the first compressor 67, i.e., in the first half of the starting, and the output contact point of the first switch 62 is electrically cut off from the first starting capacitor 73 after the starting. The fourth switch 71 is turned off in starting the first compressor 67, and is kept a turned on state in response to the switching control signal from the second controlling part 64 in starting of the second compressor 68 after completion of the starting of the first compressor 67, i.e., in the second half of the starting and until the operation is finished after the starting. And, the fifth switch 75 is kept turned on only in the second half of the starting, to provide the current of the utility voltage through the fourth switch 71 to the second starting capacitor 76. Therefore, in starting the second compressor 68, the starting capacitance from the second starting capacitor 76 is provided to the supplementary winding 81 of the second compressor 68. Then, once starting of the second compressor 68 is completed, the fifth switch 75 is turned off, and the second starting capacitor 76 provides no more starting capacitance to the supplementary winding 81 of the second compressor 68.

In the meantime, since only the second switch 70 and the fourth switch 71 are kept turned on states after completion of starting of the first compressor 67 and the second compressor 68, the current of the utility voltage is provided only to the first operating capacitor 74 and the second operating capacitor 77, and, since the first operating capacitor 74 and the second operating capacitor 77 are respectively connected to the supplementary winding 79 of the first compressor 67 and the supplementary winding 81 of the second compressor 68, relevant operating static capacitances are provided to the supplementary windings 79 and 81 of the first and second compressors 67 and 68. Accordingly, as both of the starting static capacitances and the operating static capacitances are supplied to the supplementary windings 79 and 81 of the first and second compressors 67 and 68 in starting, relatively greater static capacitances are provided in the starting in comparison to a time period after starting, thereby improving the starting efficiency. In the meantime, triac 69 in the current controlling part 65 is driven in response to the phase control signal for controlling a phase of the current of the utility voltage supplied to the main windings 67 and 68 in common. As explained, the triac 69 as the phase controlling part receives the phase control signal of the second controlling part 64 as a gate voltage thereof for controlling a phase of the current of the utility voltage. In general, the gate voltage is in a pulse form, and has a great duty ratio when the utility voltage is lower than a reference value(for example, 110V or 220V) and a small duty ratio when the utility voltage is higher than the reference value, thereby permitting flow of appropriate current, not overcurrents, to the main windings 78 and 80 of the compressors 67 and 68. When the first compressor 67 is starting as the third switch 72 is switched on, though the first starting capacitor 73 and the first operating capacitor 74 are connected in parallel to each other for providing the starting torque capacitance to the supplementary winding 79 of the first compressor 67, only the first operating capacitor 74 is used after the starting for supplying the operating static capacitance to the supplementary winding 79 of the first compressor 67. Opposite to this, when the second compressor 68 is starting as the fourth switch 71 and the fifth switch 75 are switched on, the second starting capacitor 76 and the second operating capacitor 77 are connected in parallel to each other for providing the starting torque capacitance to the supplementary winding 81 of the second compressor 68, only the second operating capacitor 77 is used after the starting for supplying the operating static capacitance to the supplementary winding 81 of the second compressor 68. On the other hand, since the second switch 70 is kept switched on after the starting, a current of a regular size of the utility voltage is provided to the main windings 78 and 80 without passing through the triac 69.

Though not shown in FIG. 9, there may be a transformer for obtaining a desired internal voltage from the utility voltage supply 63, a voltage sensing part for sensing a size of the utility voltage and providing to the second controlling part 64, and a frequency sensing part for sensing a frequency of the utility voltage from the internal voltage provided from the transformer and providing to the second controlling part 64 in FIG. 9, additionally.

In the meantime, the second controlling part 64 generates the control signals, i.e., the switching control signal and the phase control signal, varied depending on a size and frequency of the utility voltage sensed through the voltage sensing part and the frequency sensing part, and provides the control signals to the current controlling part 65 and the static capacitance controlling part 66. As explained, if the utility voltage is changed, the phase control signal from the second controlling part 64 is also changed, resulting to flow a constant current to the main windings 78 and 80 since the triac 69 in the current controlling part 65 is operated in response to the changed phase control signal.

The operation of the seventh embodiment device for controlling supply of current and static capacitance to compressors of the present invention will be explained with reference to FIG. 9.

When the first controlling part 61 generates a compressor driving turn on signal by the user's selection, the first switch 62 is turned on, to close the circuit. Then, if the utility voltage is provided through the utility voltage supply 63, the transformer is provided with internal voltages required for the control device from the utility voltage. Then, the second controlling part 64 in the control device is initialized, such that the voltage sensing part provides a size of the sensed voltage to the second controlling part 64. The frequency sensing part senses the frequency of the utility voltage, and provides to the second controlling part 64. The second controlling part 64 uses the size and the frequency of the utility voltage in determining a state of the utility voltage. Then, the second controlling part 64 generates control signals, i.e., a phase control signal and a switching control signal, for providing to the current controlling part 65 and the static capacitance controlling part 66 according to the determined state of the utility voltage. That is, a switching control signal is generated for determining a starting time at which the current of the utility power is provided to the first starting capacitor 73 in the static capacitance controlling part 66, and a second switching control signal is generated for starting the first compressor 67 and the second compressor 38 in succession, and the switching control signals are provided to the second switch 70, the third switch 72, the fourth switch 71, and the fifth switch 75. Accordingly, in the first half of the starting(when the first compressor is started) the third switch 72 is turned on and the rest of switches are turned off in response to the first switching control signal. And, in the second half of the starting(when the second compressor 68 is started), in response to the switching control signal, only the fourth switch 71 and the fifth switch 75 are turned on, and the rest of the switches are turned off. After the starting, only the second switch 70 and the fourth switch 71 are turned on and the rest of the switches are turned off. And, as explained, the second controlling part 64 provides the phase control signal for controlling the phase of the current of the utility voltage supplied to the main windings 78 and 80 of the compressors 67 and 68. With the phase control signal, the triac 69 is driven, and the current provided to the main windings 78 and 80 is varied. As explained, the phase control signal is a rectangular signal provided to the gate of the triac 69 in the starting, a duty ratio thereof is fixed based on the size of the utility voltage provided from the voltage sensing part, and an output time point thereof to the current controlling part 65 is fixed based on the frequency value of the utility voltage provided from the frequency sensing part. That is, the phase control signal is started to be supplied to the triac 69 in response to a frequency signal sensed through the frequency sensing part. For example, starting from a time point a signal form the frequency sensing part rises from '0'V to '5V', a timer(not shown) in the second controlling part 64 comes into operation, and the phase control signal of a rectangular form fixed according to the state of the utility voltage is provided to the gate of the triac 69. By the way, the phase control signal provided to the triac 69 is generated by the second controlling part 64 such that a constant current of limited size flows to the main windings 78 and 80 in an initial time period of the starting of the compressor, a gradually increasing current flows to the main windings 78 and 80 in a middle time period of the starting, and a current of regular size of the utility voltage flows to the main windings 78 and 80 in a final time period of the starting.

It is required that the supplementary windings 79 and 81 of the two compressors 67 and 68 are provided with relatively great static capacitances in the starting than after the starting for improving starting characteristics. Therefore, the first operating capacitor 74 and the first starting capacitor 73 are connected in parallel as the third switch 72 is turned on and the fourth switch 71 is turned off, to produce a great starting static capacitance, which is provided to the supplementary winding 79 of the first compressor 67 in starting of the first compressor 67. Then, the second operating capacitor 77 and the second starting capacitor 76 are connected in parallel as the third switch 72 is turned off and the fourth switch 71 and the fifth switch 75 are turned on, to produce a great starting static capacitance, which is provided to the supplementary winding 81 of the second compressor 68 in the second half of the starting. Upon completion of starting of the two compressors 67 and 68, since the third switch 72 is turned off to leave open, the supplementary winding 79 of the first compressor 67 is provided only with the operating static capacitance from the second capacitor 74 during operation, and the supplementary winding 81 of the second compressor 68 is provided only with the operating static capacitance from the second operating capacitor 77 during operation. In the meantime, as explained, the phase control signal and the switching control signal for the compressors 67 and 68 are determined according to a state of the utility voltage. That is, in a case the utility voltage is lower than a preset overvoltages, turn on time periods of the triac 69 and the third switch 72 and the fifth switch 75 are set longer, to start the compressor 67 and 68 well even at a low voltage. Opposite to this, in a case the utility voltage is higher than the preset overvoltages, turn on time periods of the triac 69 and the third switch 72 and the fifth switch 75 are set shorter, to prevent flow of over current to the main windings 78 and 80.

In the meantime, as explained, if the starting of the compressors 67 and 68 is completed as the triac 69 is operated for a preset time period, the compressors 67 and 68 are brought into a after start state. After the starting, the third switch 72 and the fifth switch 75 are turned off to leave open, and the second switch 70 and the fourth switch 71 are only turned on, to provide the current of the utility voltage supplied to the main windings 79 and 81 as it is, and only the static capacitances generated by the starting capacitors 74 and 77 to the supplementary windings 79 and 81. If a preset time period is passed after the staring, the second switch 70 is turned on, to permit the current of the utility voltage to flow to the main windings 78 and 80 in common through the second switch 70 instead of the triac 69. In this instance, the triac 69 maintains a turned on state for a preset time period even after the third switch 72 and the fifth switch 75 are turned off and the second switch 70 is turned on for making stable operation of the device. In the meantime, as shown in FIG. 9, once the first switch 62 is turned off to leave open by the compressor driving turn off signal from the first controlling part 61, as a main controlling part, the utility voltage is supplied to the compressors 67 and 68 no more, and operation of the compressors 67 and 68 are stopped. As explained, the present invention may be applied to an air conditioner having two compressors.

As explained, the seventh embodiment device for controlling supply of current and static capacitance to compressors of the present invention has the following advantages.

Because a starting time and a size of the phase control signal are controlled according to the utility voltage, and the phase control signal drives the triac, to control a size of the current to be supplied to the main windings, a stable current can always be supplied to the compressors regardless of variation of the utility voltage. And, in the starting, since the first and second compressors are started in an order by the operation of the switches, the current of the utility voltage can be used efficiently. And, the controlling of current to the plurality of compressors by means of the control device permits to simplify a system of the control device.

Figure 10:
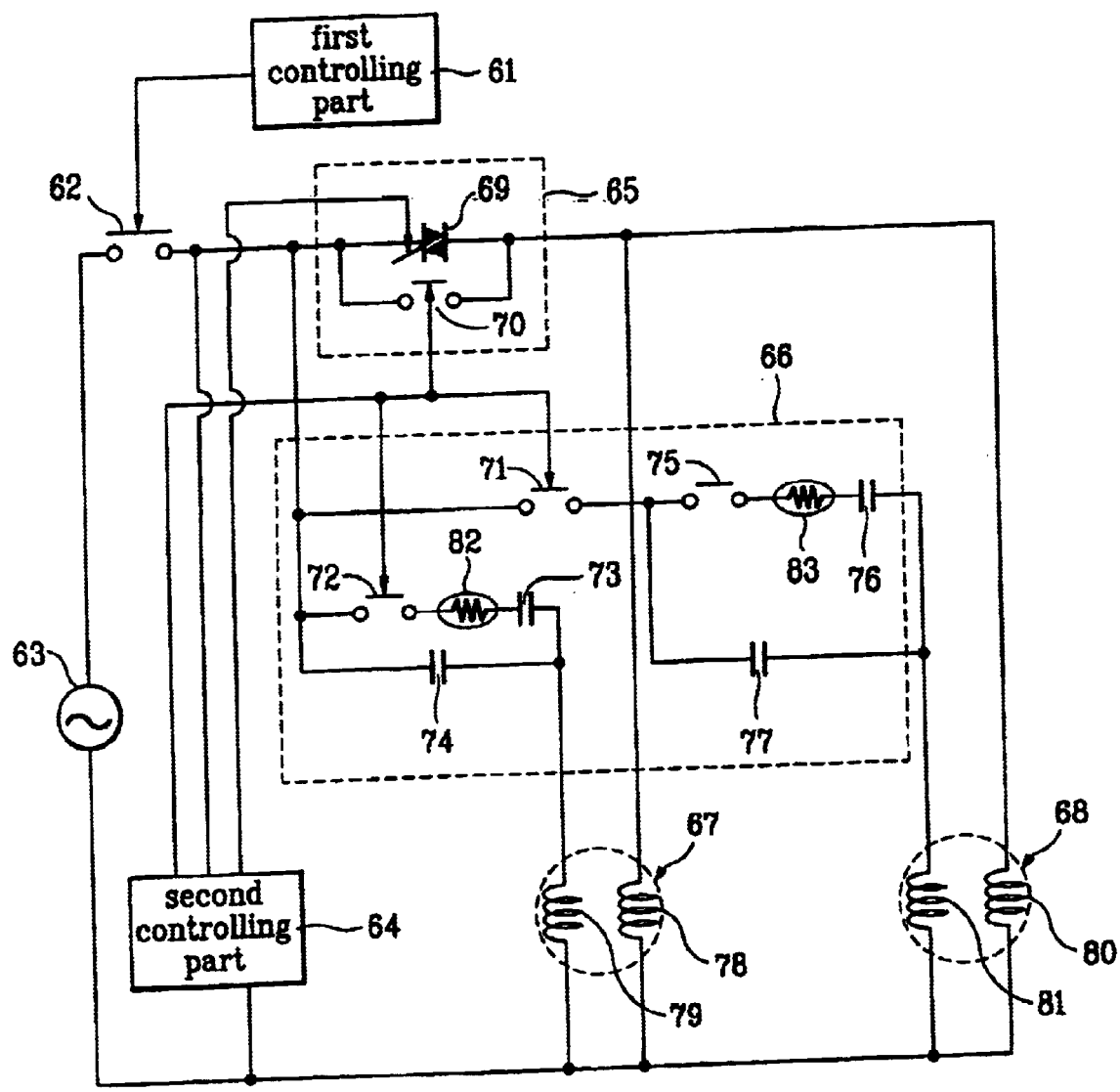
FIG. 10 illustrates a diagram showing a device for controlling supply of current and static capacitance to compressor in accordance with an eighth preferred embodiment of the present invention.

FIG. 10 illustrates a diagram showing a device for controlling supply of current and static capacitance to compressors in accordance with an eighth preferred embodiment of the present invention. The device in FIG. 10 is actually identical to a system in FIG. 9 which is the seventh embodiment system except that there is a negative temperature coefficient resister further between the third switch 72 and the first stating capacitor 73 and between the fifth switch 75 and the second starting capacitor 76 in the static capacitance controlling part 66 in FIG. 9, respectively.

Referring to FIG. 10, the device for controlling supply of current and static capacitance to compressors in accordance with an eighth preferred embodiment of the present invention includes a utility voltage supply 63, a first controlling part 61 for controlling overall operation of the two compressors 67 and 68, and providing driving turn on/off signals for the compressors 67 and 68 according to a user's selection, a first switch 62 for being switched by the driving turn on/off signals for the compressors 67 and 68 for supplying the utility voltage to the compressors 67 and 68, a second controlling part 64 for providing a phase control signal and a switching control signal varied with a state of a size and a frequency of the utility voltage, and different before and after the starting, a current controlling part 65 having an internal circuit system changeable in response to the switching control signal and controlling a phase of the current of the utility voltage in response to the phase control signal for limiting the current of the utility voltage in supplying the current to the main windings 78 and 80 of the compressor 67 and 68 in common during starting and releasing the limiting of the current after the starting to supply a regular sized current of the utility voltage, and a static capacitance controlling part 66 having a function for preventing a surge current caused by a momentary discharge having an internal circuit changeable in response to the switching control signal for supplying respective starting static capacitances from the current of the utility voltage in a sequence in starting and respective operative static capacitances from the current of the utility voltage to the supplementary windings 79 and 81 of the compressors 67 and 68 on the same time in starting, and supplying only the respective operative static capacitances from the current of the utility voltage to the supplementary windings 79 and 81 after the starting in response to the control signal. The current controlling part 65 supplies a current to the main windings 78 and 80 of the compressors 67 and 68 in common in a direction the current is increased gradually between an initial starting point to a starting completion point in response to the phase control signal and the switching control signal. And, the current controlling part 65 includes a second switch 70 for switching over an output contact point of the first switch 70 and the main windings 78 and 80 in response to the switching control signal, and a phase controlling part 69 connected in parallel to the second switch 61 between an input contact point and an output contact point of the second switch 70 for controlling a phase of the current to be supplied to the main winding 78 and 80 in common depending on a switching on/off state of the second switch 70 and the phase control signal. The static capacitance controlling part 66 includes a third switch 72 having an input contact point connected to an output contact point of the first switch 62 for being switched on/off in response to the switching control signal, a first negative temperature coefficient resister 82 having a first terminal connected to an output contact point of the third switch 72, a first starting capacitor 73 having a first terminal connected to a second terminal of the first negative temperature coefficient resister 82 and a second terminal connected to the supplementary winding 79 of the first compressor 67, a first operating capacitor 74 having a first terminal connected to an output contact point of the first switch 62, and a second terminal connected both to the second terminal of the first capacitor 73 and the supplementary winding 79 of the first compressor 67, a fourth switch 71 having an input contact point connected to an output contact point of the first switch 62, a fifth switch 71 having an input contact point connected to an output contact point of the fourth switch 71, a second temperature counter 83 having a first terminal connected to an output contact point of the fifth switch 71, a second starting capacitor 76 having a first terminal connected to a second terminal of the second negative counter 83 and a second terminal connected to the supplementary winding 81 of the second compressor 68, and a second operating capacitor 77 having a first terminal connected both to an output contact point of the fourth switch 71 and an input contact point of the fifth switch 75 and a second terminal connected both to a second terminal of the second starting capacitor 76 and the supplementary winding 81 of the second compressor 68.

The first negative counter 82, provided between the third switch 72 and the first starting capacitor 73, prevents a surge current from flowing to the third switch 72 caused by a momentary discharge between the first starting capacitor 73 and the first operating capacitor 74 at an initial starting, thereby preventing seizure of the third switch 72. That is, for a few seconds before the triac 45 is turned on, charges both in the first operating capacitor 74 and in the first starting capacitor 73 are liable to flow to the supplementary winding 79 in a surged current. In this instance, at the moment the third switch 72 is turned on for using the first starting capacitor 73, the surge current may occur due to a momentary discharge. However, the first negative temperature coefficient resister 82 provided between the first starting capacitor 73 and the first operation capacitor 74 can prevent the seizure of the third switch 72 caused by the surge current. That is, the first negative temperature coefficient resister 82 has a great initial resistance which becomes the smaller as the first negative temperature coefficient resister 82 generates a heat to heat itself according to its characteristics. The great initial resistance permits to prevent breakage of the third switch 47 caused by the surge current. Alikely, the second negative counter 83, provided between the fifth switch 75 and the second starting capacitor 76, prevents a surge current from flowing to the fifth switch 75 caused by a momentary discharge between the second starting capacitor 76 and the second operating capacitor 76 at an initial starting, thereby preventing seizure of the fifth switch 75.

The operation of the eighth embodiment device will be omitted as the operation is the same with the seventh embodiment device except for the part of the negative temperature coefficient resister.

As has been explained, the eighth embodiment device of the present invention has the following advantages in addition to the advantages of the seventh embodiment device. The eighth embodiment device has a negative temperature coefficient resister between the third switch and the first starting capacitor and between the fifth switch and the second starting capacitor, of which resistance is varied with heat generation. Accordingly, occurrence of the surge current between the starting capacitor and the operating capacitor at the moment of turning on the triac at an initial starting is prevented, and furthermore, seizure of contact points of the adjacent switches, or breakage of the starting capacitors can be prevented.

Figure 11:
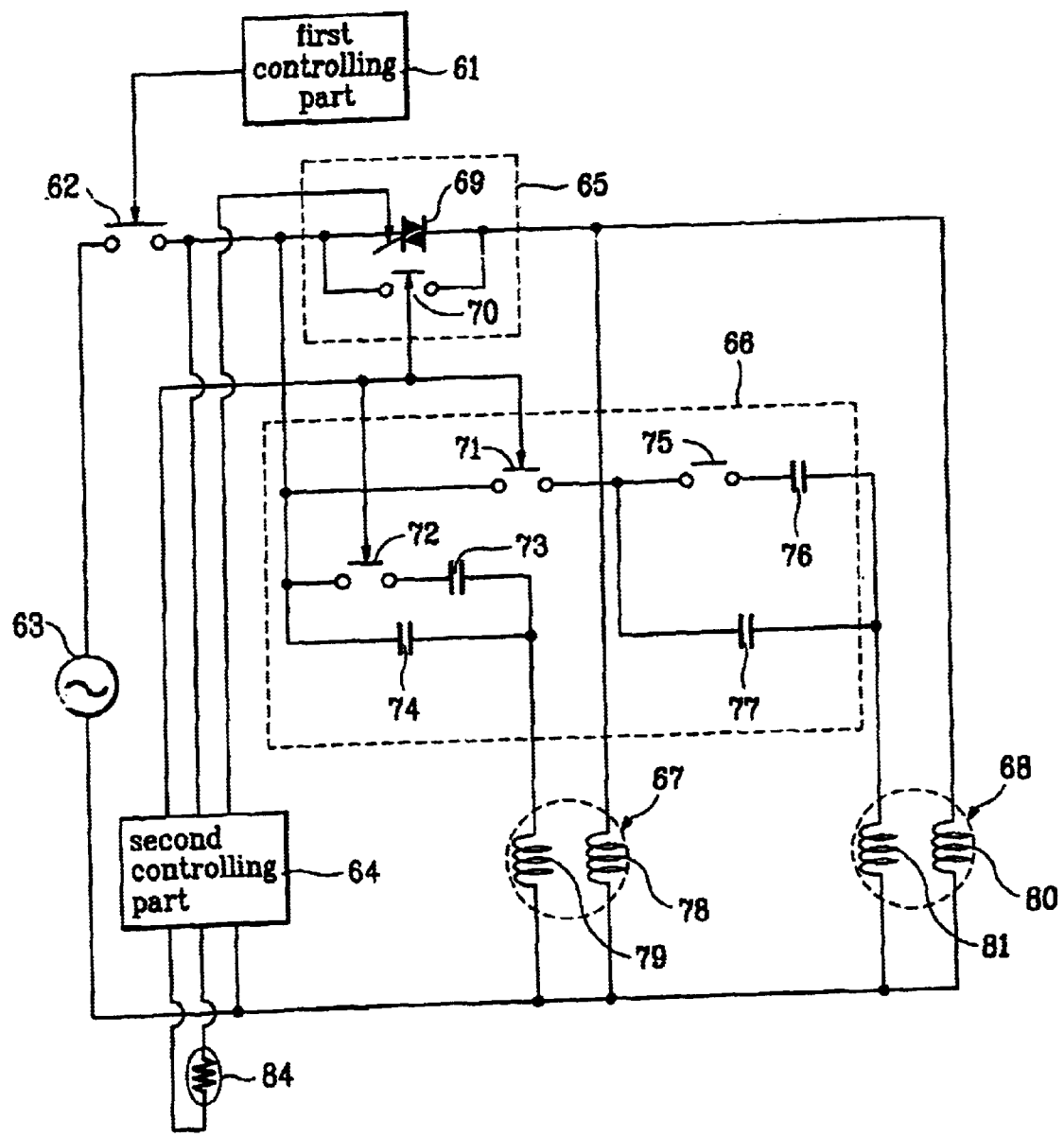
FIG. 11 illustrates a diagram showing a device for controlling supply of current and static capacitance to compressors in accordance with a ninth preferred embodiment of the present invention.

FIG. 11 illustrates a diagram showing a device for controlling supply of current and static capacitance to compressors in accordance with a ninth preferred embodiment of the present invention. The device in FIG. 11 is identical to a system of the seventh embodiment except that there is an external temperature sensing part 84 for providing external temperature of the compressors to the second controlling part 64. Accordingly, a system of the ninth embodiment device and a function of the external temperature sensing part will be explained.

Referring to FIG. 11, the device for controlling supply of current and static capacitance to compressors in accordance with a ninth preferred embodiment of the present invention includes a utility voltage supply 63, a first controlling part 61 for controlling overall operation of the two compressors 67 and 68, and providing driving turn on/off signals for the compressors 67 and 68 according to a user's selection, a first switch 62 for being switched by the driving turn on/off signals for the compressors 67 and 68 for supplying, or cutting off the supplying of the utility voltage to the compressors 67 and 68, a temperature sensing part 84 for sensing an external temperature of the compressors 67 and 68, a second controlling part 64 for providing a phase control signal and a switching control signal varied with a state of a size and a frequency of the utility voltage and the sensed external temperature, and different before and after the starting, a current controlling part 65 having an internal circuit system changeable in response to the switching control signal and controlling a phase of the utility voltage in response to the phase control signal for limiting the current of the utility voltage in supplying the current to the main windings 78 and 80 of the compressor 67 and 68 in common during starting and releasing the limiting of the current after the starting to supply a regular sized current of the utility voltage, and a static capacitance controlling part 66 having an internal circuit changeable in response to the switching control signal for supplying respective starting static capacitances from the current of the utility voltage in a sequence in starting and respective operative static capacitances from the current of the utility voltage to the supplementary windings 79 and 81 of the compressors 67 and 68 in common in starting, and supplying only the respective operative static capacitances from the current of the utility voltage to the supplementary windings 79 and 81 after the starting in response to the control signal.

As other systems in FIG. 11 are identical to the seventh embodiment, detailed explanation of the systems will be omitted except for the external temperature sensing part 84.

The external temperature sensing part 84 may be a thermistor. In the meantime, the temperature sensing part 84 senses an external temperature of the compressors 67 and 68, and provides to the second controlling part 64. Then, the second controlling part 64 generates a phase control signal and a switching control signal for providing to the current controlling part 65 and the static capacitance controlling part 66 according to the sensed state of the utility voltage and the external temperature. And, for controlling the phase of the current of the utility voltage supplied to the main windings 78 and 80 of the compressors 67 and 68, the second controlling part 64 provides the phase control signal, which may vary with the temperature value received from the temperature sensing part 84. That is, the second controlling part 64 compares the external temperature measured presently and a preset reference temperature, to find a season pertinent to the present external temperature and provide phase control signals consistent to the season. The phase control signal is provided to a gate of the triac 69 in forms of pulses. For example, in a case the external temperature is higher than T1 set as a reference temperature for summer, a pulse width of the phase control signal provided to the triac 69 is set to P3 of summer, in a case the external temperature is below T3 set as a reference temperature for winter, a pulse width of the phase control signal is set to P1 of winter, and, if the external temperature is T2 between T1 and T3 set as a reference temperature for spring and fall, a pulse width of the phase control signal is set to P2 of spring and fall. For reference, in starting the compressors 67 and 68, the pulse width of the phase control signal is required to be large if the external temperature is low because the low external temperature leads a viscosity of the refrigerant poor to restrict a compressor motor substantially. Therefore, P1 has the largest pulse width, P2 has a next large pulse width, and P3 has the smallest pulse width. In this instance, it is considered that the state of the utility voltage is regular. According to the phase control signal set with respective to a season, the triac 69 is driven, and a current provided to the main windings 78 and 80 is varied. As explained, the phase control signal is a rectangular signal provided to the gate of the triac 69, a duty ratio thereof is fixed, not only based on the external temperature, but also based on a size of the utility voltage sensed already, and an output time point thereof is fixed based on the frequency value of the utility voltage.

As has been explained, the ninth embodiment device of the present invention can optimize starting of the compressors since the phase control signal provided to the triac can be varied with seasons, appropriately. And, a starting current can be used efficiently because the static capacitance controlling part starts the first compressor at first, and then the second compressor in starting.

Figure 12:
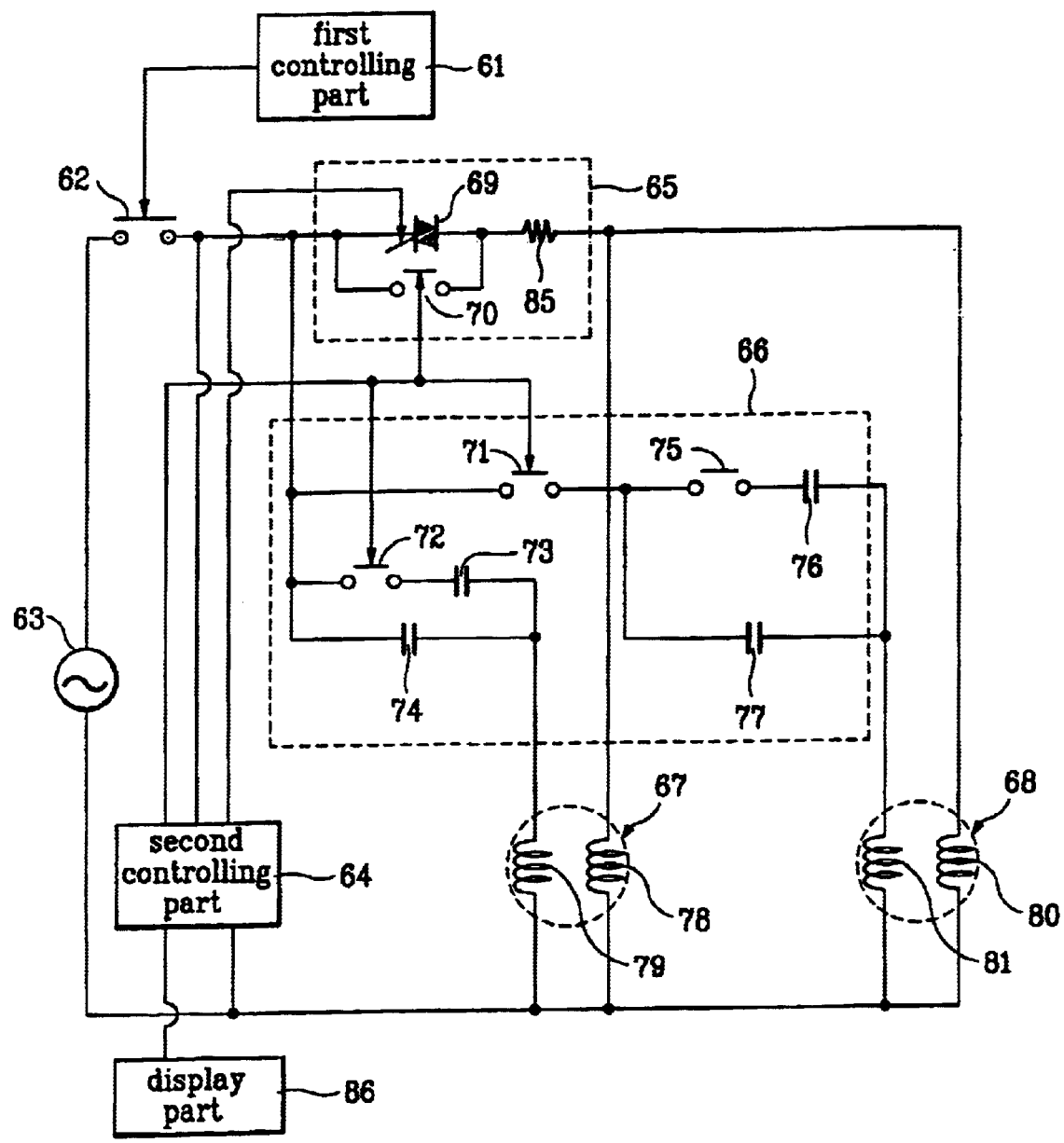
FIG. 12 illustrates a diagram showing a device for controlling supply of current and static capacitance to compressor in accordance with a tenth preferred embodiment of the present invention.

FIG. 12 illustrates a diagram showing a device for controlling supply of current and static capacitance to compressors in accordance with a tenth preferred embodiment of the present invention. The device in FIG. 12 is identical to a system of the seventh embodiment except that there is a current detecting part 85 for detecting currents to the main windings 78 and 80 of the compressors 67 and 68 in starting and a display part 86 for displaying a state of detected current in response to a display signal from the second controlling part 64 to inform to a user. Accordingly, a system of the ninth embodiment device and the display part will be explained.

Referring to FIG. 12, the device for controlling supply of current and static capacitance to compressors in accordance with a tenth preferred embodiment of the present invention includes a utility voltage supply 63, a first controlling part 61 for controlling overall operation of the two compressors 67 and 68, and providing driving turn on/off signals for the compressors 67 and 68 according to a user's selection, a first switch 62 for being switched by the driving turn on/off signals for the compressors 67 and 68 for supplying, or cutting off the supplying of the utility voltage to the compressors 67 and 68, a current detecting part 85 for detecting currents to the main windings 78 and 80 of the compressors 67 and 68 and providing to the second controlling part 64 in starting, a second controlling part 64 for providing a phase control signal and a switching control signal varied with a state of a size and a frequency of the utility voltage, and different before and after the starting, and a display signal for displaying states of currents to the main windings 78 and 80 detected in the starting, a current controlling part 65 having an internal circuit system changeable in response to the switching control signal and controlling a phase of the utility voltage in response to the phase control signal for limiting the current of the utility voltage in supplying the current to the main windings 78 and 80 of the compressor 67 and 68 in common during starting and releasing the limiting of the current after the starting to supply a regular sized current of the utility voltage, a display part 86 for displaying the detected states of currents to outside of the device in response to the display signal, and a static capacitance controlling part 66 having an internal circuit changeable in response to the switching control signal for supplying respective starting static capacitances from the current of the utility voltage in a sequence in starting and respective operative static capacitances from the current of the utility voltage to the supplementary windings 79 and 81 of the compressors 67 and 68 in common in starting, and supplying only the respective operative static capacitances from the current of the utility voltage to the supplementary windings 79 and 81 in common after the starting in response to the control signal. In FIG. 12, the current detecting part 85 may be a resistor, and the display part 86 may be an LED(Light Emitting Diode). Hereafter, the display part will be called as an LED 86 and the current detecting part will be called as a resistor 85.

And, the second controlling part 64 provides the display signal for informing states of the present currents to the main windings 78 and 80 of the compressors 67 and 68 in starting. As explained, the display signal may vary with a current value flowing to the main windings 78 and 80 in the starting. That is, the second controlling part 64 compares the measured present current value to the main windings 78 and 80 and a preset reference overcurrent, to find a state of the present current value, and provide a phase control signal consistent to the state. For example, in a case the current to the main windings 78 and 80 is greater than the preset first overcurrent, the LED 86 is made to flash to give alarm to the user, if the detected current is lower than the preset first overcurrent and higher than a preset second overcurrent, the LED 86 is turned on so that the user can make a service call, and in a case the detected current to the main windings 78 and 80 is lower than the preset second overcurrent, the second controlling part 64, assuming that it as a regular state, turns off the LED 86. This display method may be replaced with other method.

As has been explained, the tenth embodiment device of the present invention can make the user to know that there is an overcurrent flowing to the main windings since the current to the main windings is sensed always and displayed outside of the device. And, a starting current can be used efficiently because the static capacitance controlling part starts the compressor at first, and then the second compressor.

Figure 13:
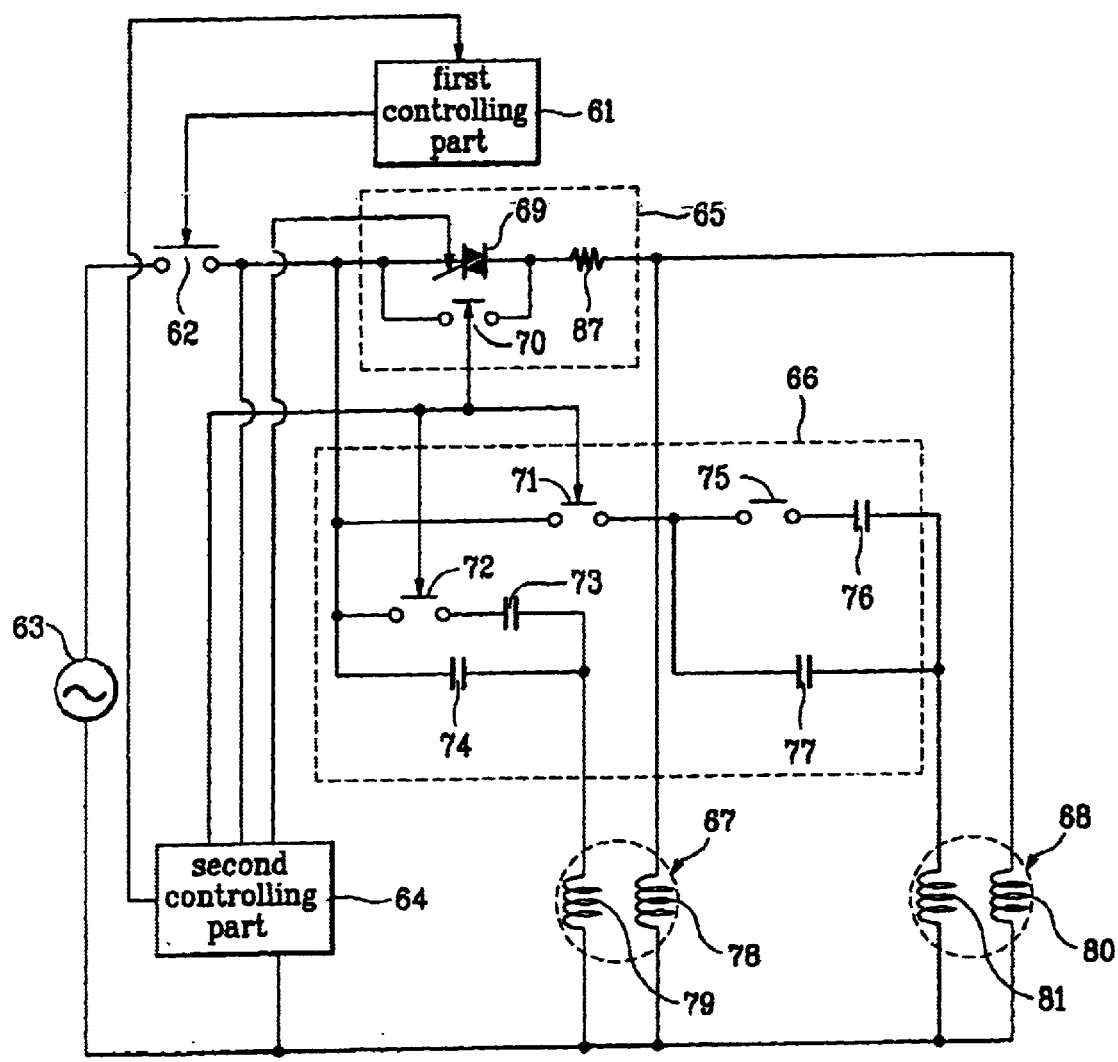
FIG. 13 illustrates a diagram showing a device for controlling supply of current and static capacitance to compressors in accordance with an eleventh preferred embodiment of the present invention.

FIG. 13 illustrates a diagram showing a device for controlling supply of current and static capacitance to compressors in accordance with an eleventh preferred embodiment of the present invention. The device in FIG. 13 is identical to a system of the seventh embodiment in FIG. 9 except that there is a current detecting part 87 on an output side of the current controlling part 65. Accordingly, the system and operation will be explained centered on the current detecting part 87.

Referring to FIG. 13, the device for controlling supply of current and static capacitance to compressors in accordance with an eleventh preferred embodiment of the present invention includes a utility voltage supply 63, a first controlling part 61 for controlling overall operation of the two compressors 67 and 68, and providing driving turn on/off signals for the compressors 67 and 68 according to a user's selection, a first switch 62 for being switched by the driving turn on/off signals for the two compressors 67 and 68 for supplying the utility voltage to the compressors 67 and 68, a current detecting part 87 for detecting respective currents to the main windings 78 and 80 of the compressors 67 and 68 in starting, a second controlling part 64 for providing a phase control signal and a switching control signal varied with a state of a size and a frequency of the utility voltage and the currents to the main windings 78 and 80 in starting, and different before and after the starting, a current controlling part 65 having an internal circuit system changeable in response to the switching control signal and controlling a phase of the utility voltage in response to the phase control signal for limiting the current of the utility voltage in supplying the current to the main windings 78 and 80 of the compressor 67 and 68 in common during starting and releasing the limiting of the current after the starting to supply a regular sized current of the utility voltage, and a static capacitance controlling part 66 having an internal circuit changeable in response to the switching control signal for supplying respective starting static capacitances from the current of the utility voltage in a sequence in starting and respective operative static capacitances from the current of the utility voltage to the supplementary windings 79 and 81 of the compressors 67 and 68 on the same time in starting, and supplying only the respective operative static capacitances from the current of the utility voltage to the supplementary windings 79 and 81 on the same time after the starting in response to the control signal. In FIG. 13, the current detecting part 87 may be a resistor, and the phase controlling part 69 may be a triac.

In the meantime, when the current detecting part 87 senses the current to the main windings 78 and 80 and provides to the second controlling part 64, the second controlling part 64 provides a starting voltage value at the main windings 78 and 80 by multiplying the present current value to the main windings 78 and 80 of the compressors 67 and 68 and a resistance of the current detecting part 87(hereafter called as a resistor 87). The phase control signal may vary with the measured current to the main windings 78 and 80 presently, i.e., the starting voltage value. That is, the second controlling part 64 compares the measured present starting voltage value to a preset reference overvoltages, to find a state of the present current value to the main windings 78 and 80 and vary the phase control signal consistent to the state. For example, in a case the current to the main windings 78 and 80 is greater than the preset first overcurrent, the second controlling part 64 informs the fact to the first controlling part 61 so that the first controlling part 61 knows that the compressors 67 and 68 is in a critical state. Then, the first controlling part 61 applies a driving turn off signal to the first switch 62, to turn off, to open the first switch 62. Accordingly, the utility voltage will be supplied to the compressor no more, and the compressors 67 and 68 stops the operation. In a case the detected current to the main windings 78 and 80 is lower than the preset first overcurrent and greater than the preset second overcurrent, assuming that an overcurrent flows to the main windings 78 and 80, the second controlling part 64 reduces a width of the phase control signal applied to the gate of the triac 69 in a form of pulse. And, in a case the detected current to the main windings 78 and 80 is lower than the preset second overcurrent, assuming that it as a regular state, the second controlling part 64 maintains an initial phase control value as it is and provides to the triac 69. This phase control signal varying method may he replaced with other method.

As has been explained, the eleventh embodiment device of the present invention can always provide a stable starting current to the main windings by appropriately varying the phase controlling signal and providing to the triac at the second controlling part according to variations of current to the main windings in starting.

Figure 14:
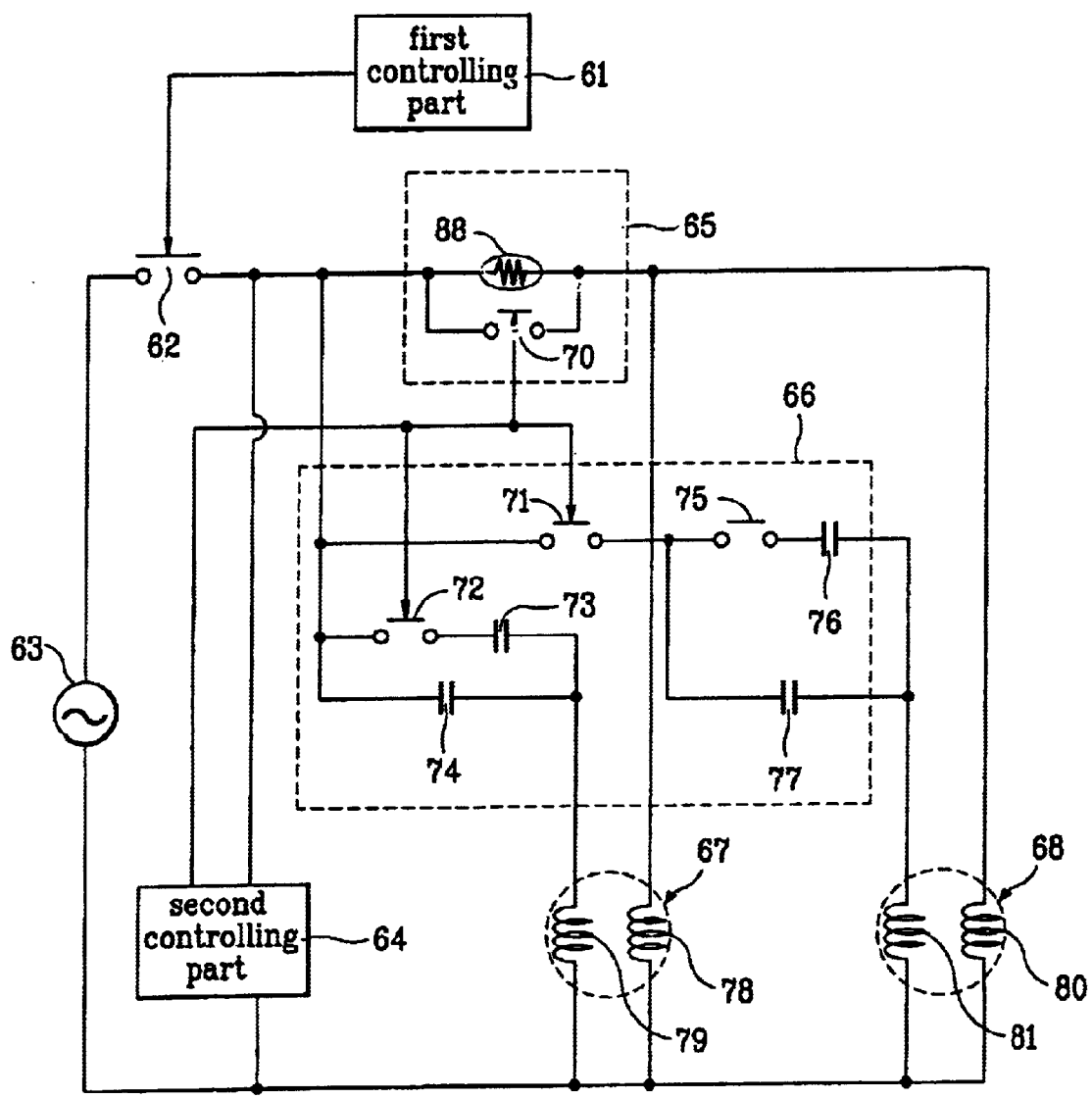
FIG. 14 illustrates a diagram showing a device for controlling supply of current and static capacitance to compressors in accordance with a twelfth preferred embodiment of the present invention.

FIG. 14 illustrates a diagram showing a device for controlling supply of current and static capacitance to compressors in accordance with a twelfth preferred embodiment of the present invention.

Referring to FIG. 14, the device for controlling supply of current and static capacitance to compressors in accordance with a twelfth preferred embodiment of the present invention includes a utility voltage supply 66, a first controlling part 61 for controlling overall operation of the two compressors 67 and 68, and providing driving turn on/off signals for the compressors 67 and 68 according to a user's selection, a first switch 62 for being switched by the driving turn on/off signals for the compressors 67 and 68 for supplying the utility voltage to the compressors 67 and 68, a second controlling part 64 for providing a switching control signal varied with a state(a size and a frequency) of the utility voltage, a current controlling pact 65 having an internal circuit system changeable in response to the switching control signal for limiting the current of the utility voltage by using its own resistance characteristics of reversely proportional to a temperature thereof in supplying the current to the main windings 78 and 80 of the compressor 67 and 68 in common during starting and releasing the limiting of the current after the starting to supply a regular sized current of the utility voltage, and a static capacitance controlling part 66 having an internal circuit changeable in response to the switching control signal for supplying respective starting static capacitances from the current of the utility voltage in a sequence in starting and respective operative static capacitances from the current of the utility voltage to the supplementary windings 79 and 8S of the compressors 67 and 68 on the same time in starting, and supplying only the respective operative static capacitances from the current of the utility voltage to the supplementary windings 79 and 81 after the starting in response to the control signal. The current controlling part 65 supplies the current to the main windings 78 and 80 of the compressors 67 and 68 in common in a direction the current is increased gradually between an initial starting point to a starting completion point in response to the switching control signal. And, alike the seventh embodiment device, the current controlling part 65 includes a second switch 70 for switching over an output contact point of the first switch 62 and the main windings 78 and 80 in response to the switching control signal, and a negative temperature coefficient resister 88 connected in parallel to the second switch 61 between an input contact point and an output contact point of the second switch 70 for controlling the current to be supplied to the main winding 78 and 80 in common depending on a switching on/off state of the second switch 70. Since a system of the static capacitance controlling part 66 is identical to the seventh embodiment device, explanations for the same will be omitted.

In the meantime, as shown in FIG. 14, in an initial starting, if the second switch 70 is turned off to leave open and the negative temperature coefficient resister 88 is provided with the utility voltage, the negative temperature coefficient resister 88 limits the utility voltage thereby preventing an overcurrent from flowing to the main windings 78 and 80 of the compressors 67 and 68. The negative temperature coefficient resister 88 has an adequate initial resistance such that a starting current supplied to the main windings 78 and 80 in the starting of the compressor not to exceed a preset reference starting current. That is, since the negative temperature coefficient resister 88 has the greatest initial resistance value and a resistance component that becomes the smaller, as the temperature thereof becomes the higher, the negative temperature coefficient resister 88 limits the starting current to the main windings 78 and 80 of the compressors 67 and 68 by means of the initial resistance. In continuation, if a current for the utility voltage is supplied to the negative temperature coefficient resister 88, the negative temperature coefficient resister itself generates heat to reduce the initial resistance, sharply. Then, upon completion of the starting after a while, the switching control signal turns on the second switch 70, to cut off the circuit, such that the current of the utility voltage flows to the main windings 78 and 80 through the second switch 70 in a regular size without passing through the negative temperature coefficient resister 88.

As has been explained, the twelfth embodiment device of the present invention can prevent an overcurrent from flowing to the main windings by supplying a current limited by the negative temperature coefficient resister having a resistance reversely proportional to a temperature thereof in starting, and, not only enhance a starting current, but also simplify a system of the control device since one control device can start the first compressor at first and the second compressor the next.

It will be apparent to those skilled in the art that various modifications and variations can be made in the device and method for controlling supply of current and static capacitance to compressors of the present invention without departing from the spirit or scope of the invention. Thus, it is intended that the present invention cover the modifications and variations of this invention provided they come within the scope of the appended claims and their equivalents.

What is claimed is:

1. A device for controlling supply of current and static capacitance to compressors comprising:
   a first controlling part for controlling overall operation of a plurality of compressors, and generating a compressor turn on/off signal;
   a utility voltage supply for supplying a utility voltage;
   a switch switchable in response to the compressor driving turn on/off signal from the first controlling part for supplying or cutting off the supplying of the utility voltage to the compressors; a second controlling part for providing control signals for controlling currents and static capacitances to be supplied to main windings and supplementary windings of the compressors varied with a state of the utility voltage supply;
   a current controlling part for limiting a current of the utility voltage supply to the main windings of the compressors during starting of the compressors in response to the control signals, and releasing the limiting of the current to the main windings of the compressors after the starting of the compressors; and
   a static capacitance controlling part for supplying respective starting static capacitances and respective operative static capacitances to the supplementary windings during starting of the compressors, and supplying only the respective operative static capacitances to the supplementary windings after the starting of the compressors, in response to the control signals.

2. The device as claimed in claim 1, wherein the second controlling part includes:
   a transformer part for obtaining at least one voltage value from the external utility power supply;
   a power supply size sensing part for sensing a size of external utility power supply through the obtained at least one voltage; and
   a power supply frequency sensing part for sensing a frequency of the external utility power supply through the obtained at least one voltage value.

3. A device for controlling supply of current and static capacitance to compressors comprising:
   a utility voltage supply for supplying a utility voltage;
   a first controlling part for controlling overall operation of tire first and second compressors and providing driving turn on/off signals for the compressors according to a user's selection;
   a first switch for being switched by the driving turn on/off signals for the compressors for supplying the utility voltage to the compressors;
   a second controlling part for providing a phase control signal and a switching control signal varied with a state of the utility voltage;
   a current controlling part having an internal circuit system changeable in response to the phase control signal for limiting a current of the utility voltage to the main windings of the compressors during starting of the compressors, and releasing the limiting of the current after the starting of the compressors to supply a regular sized current of the utility voltage; and
   a static capacitance controlling part having an internal circuit changeable in response to the switching control signal for supplying respective starting static capacitances and respective operative static capacitances to supplementary windings of the first and second compressors during starting of the compressors, and supplying only the respective operative static capacitances to the supplementary windings after the starting of the compressors, in response to the control signal.

4. The device as claimed in claim 3, wherein the current controlling part supplies the current to the main windings in response to the switching control signal from an initial starting to a starting completion in a gradually increasing direction.

5. The devices as claimed in claim 3, wherein the current controlling part includes:
   a second switch for switching on/off between an output contact point of the first switch and the main windings in response to the switching control signal; and
   a phase controlling part connected between an input contact point and an output contact point of the second switch for controlling a phase of a voltage supplied to the main windings depending on switching on/off states of the second switch and the phase control signal.

6. The device as claimed in claim 5, wherein the phase controlling part is turned on for a longer time period by the varied phase control signal if the provided utility voltage is lower than a reference utility voltage, and the phase controlling part is turned on for a shorter time period by the varied phase control signal if the provided utility voltage is higher than a reference utility voltage.

7. The device as claimed in claim 5, wherein the second switch changes an internal circuit of the current controlling part in response to the switching control signal such that an output contact point of the first switch and the main windings are connected through the phase controlling part in starting of the compressors, and the output contact point of the first switch and the main windings are connected directly after the starting of the compressors.

8. The device as claimed in claim 5, wherein the phase controlling part is a triac to be driven in response to the phase control signal for controlling a phase of the voltage supplied to the main windings.

9. The device as claimed in claim 3, wherein the static capacitance controlling part includes:
   a third switch having an input contact point connected to an output contact point of the first switch for being switched on/off in response to the switching control signal;
   a starting capacitor having an input terminal connected to an output contact point of the third switch;
   a fourth switch having an input contact point connected to an output terminal of the starting capacitor, a first output contact point connected to the supplementary winding of the first compressor, and a second output contact point connected to the supplementary winding of the second compressor, the input contact point being brought into contact with the first and second output contact points in a sequence in response to the switching control signal;
   a first operating capacitor having an input terminal connected to an output contact point of the first switch, and an output terminal connected to the supplementary winding of the first compressor; and a second operating capacitor having an input terminal connected to an output contact point of the first switch, and an output terminal connected to the supplementary winding of the second compressor.

10. The device as claimed in claim 9, wherein, when the first compressor is starting, the second switch is turned off, the third switch is turned on, and the fourth switch has the input contact point connected to the first output contact point on a side of the supplementary winding of the first compressor; when the second compressor is starting, the second switch is turned off, the third switch is turned on, and the fourth switch has the input contact point connected to the second output contact point on a side of the supplementary winding of the second compressor, and, after completion of starting of the first and second compressors, the second switch is turned on, the third switch is turned off, and the fourth switch is inoperative.

11. The device as claimed in claim 3, wherein the static capacitance controlling part includes:
   a third switch having an input contact point connected to an output contact point of the first switch for being switched on/off response to the switching control signal;
   a first starting capacitor having a first terminal connected to an output contact point of the third switch, and a second terminal connected to the supplementary winding of the first compressor;
   a first operating capacitor having a first terminal connected to an output contact point of the first switch, and a second terminal connected both to the second terminal of the first starting capacitor and the supplementary winding of the first compressor;
   a fourth switch having an input contact point connected to an output contact point of the first switch;
   a fifth switch having an input contact point connected to an output contact point of the fourth switch;
   a second starting capacitor having a first terminal connected to an output point of the fifth switch, and a second terminal connected to the supplementary winding of the second compressor; and
   a second operating capacitor having a first terminal connected both to an output contact point of the fourth switch and an input contact point of the fifth switch, and a second terminal connected both to a second terminal of the second starting capacitor and the supplementary winding of the second compressor.

12. The device as claimed in claim 11, wherein, in a first half of the starting of the compressors, the second switch is turned off (opened), the third switch is turned on (closed), the fourth switch is turned off, and the fifth switch is turned off, in a second half of the starting of the compressors, the second switch is turned off (opened), the third switch is turned off, the fourth switch is turned on, and the fifth switch is turned on, and, after completion of the starting of the compressors, the second switch is turned on, the third switch is turned off, the fourth switch is turned on, and the fifth switch is turned off.

13. A device for controlling supply of current and static capacitance to compressors comprising:
   a utility voltage supply for supplying a utility voltage;
   a first controlling part for controlling overall operation of first and second compressors and providing driving turn on/off signals for the compressors according to a user's selection;
   a first switch for being switched by the driving turn on/off signals for the compressors for supplying the utility voltage to the compressors;
   a second controlling part for providing a phase control signal and a switching control signal varied with a state of the utility voltage;
   a current controlling part having an internal circuit system changeable in response to the switching control signal for controlling a phase of the utility voltage in response to the phase control signal for limiting a current of the utility voltage to main windings of the compressors during starting of the compressors, and releasing the limiting of the current after the starting of the compressors to supply a regular sized current of the utility voltage; and
   a static capacitance controlling part having a function for preventing a surge current caused by a momentary discharge and an internal circuit changeable in response to the switching control signal for supplying respective starting static capacitances and respective operative static capacitances to supplementary windings of the compressors during starting of the compressors, and supplying only the respective operative static capacitances to the supplementary windings after the starting of the compressors, in response to the control signal.

14. The device claimed in claim 13, wherein the current controlling part supplies the current to the main windings in response to the phase control signal and the switching control signal from an initial starting of the compressors to a starting completion in a gradually increasing direction.

15. The device as claimed in claim 13, wherein the current controlling part includes:
   a second switch for switching on/off between an output contact point of the first switch and the main windings in response to the switching control signal; and
   a phase controlling part connected between an input contact point and an output contact point of the second switch for controlling a phase of a voltage supplied to the main windings depending on switching on/off states of the second switch and the phase control signal.

16. The device as claimed in claim 15, wherein the phase controlling part is turned on for a longer time period by the varied phase control signal if the provided utility voltage is lower than a reference utility voltage, and the phase controlling part is turned on for a shorter time period by the varied phase control signal if the provided utility voltage is higher than a reference utility voltage.

17. The device as claimed in claim 15, wherein the phase controlling part is a triac for controlling a phase of the utility voltage by using the phase control signal as a driving signal.

18. The device as claimed in claim 13, wherein the static capacitance controlling part includes:
   a third switch having an input contact point connected to an output contact point of the first switch for being switched on/off in response to the switching control signal;
   a negative temperature coefficient resistor having a first terminal connected to an output contact point of the third switch
   a staring capacitor having a first terminal connected to a second terminal of the negative temperature coefficient resistor;
   a fourth switch having an input contact point connected to a second terminal of the starting capacitor, a first output contact point connected to the supplementary winding of the first compressor, and a second output contact point connected to the supplementary winding of the second compressor, the input contact point being brought into contact with the first and second output contact points in a sequence in response to the switching control signal;

a first operating capacitor having a first terminal connected to an output contact point of the first switch, and a second terminal connected to the supplementary winding of the first compressor; and a second operating capacitor having a first terminal connected to an output contact point of the first switch, and a second terminal connected to the supplementary winding of the second compressor.

19. The device as claimed in claim 18, wherein, when the first compressor is starting, the second switch is turned off, the third switch is turned on, and the fourth switch has the input contact point connected to the first output contact point on a side of the supplementary winding of the first compressor; when the second compressor is starting, the second switch is turned off, the third switch is turned on, and the fourth switch has the input contact point connected to the second output contact point on a side of the supplementary winding of the second compressor, and, after completion of starting of the first and second compressors, the second switch is turned on, the third switch is turned off, and the fourth switch is inoperative.

20. The device as claimed in claim 13, wherein the static capacitance controlling part includes:

a third switch having an input contact point connected to an output contact point of the first switch for being switched on/off in response to the switching control signal;

a first negative temperature coefficient resistor having a first terminal connected to an output contact point of the third switch;

a first starting capacitor having a first terminal connected to a second terminal of the first negative temperature coefficient resistor, and a second terminal connected to the supplementary winding of the first compressor;

a first operating capacitor having a first terminal connected to an output contact point of the first switch, and a second terminal connected both to the second terminal of the first starting capacitor and the supplementary winding of the first compressor;

a fourth switch having an input contact point connected to an output contact point of the first switch;

a fifth switch having an input contact point connected to an output contact point of the fourth switch;

a second negative temperature coefficient resistor having a first terminal connected to an output contact point of the fifth switch;

a second starting capacitor having a first terminal connected to a second terminal of the second negative temperature coefficient resistor, and a second terminal connected to the supplementary winding of the second compressor; and a second operating capacitor having a first terminal connected both to an output contact point of the fourth switch and an input contact point of the fifth switch, and a second terminal connected both to a second terminal of the second starting capacitor and the supplementary winding of the second compressor.

21. The device as claimed in claim 20, wherein, in a first half of the starting of the compressors, the second switch is turned off (opened), the third switch is turned on (closed), the fourth switch is turned off, and the fifth switch is turned off, in a second half of the starting of the compressors, the second switch is turned off (opened), the third switch is turned off, the fourth switch is turned on, and the fifth switch is turned on, and, after completion of the starting of the compressors, the second switch is turned on, the third switch is turned off, the fourth switch is turned on, and the fifth switch is turned off.

22. A device for controlling supply of current and static capacitance to compressors comprising:

a utility voltage supply;

a first controlling part for controlling overall operation of first and second compressors, and providing a driving turn on/off signal for the compressors according to a user's selection;

a first switch for being switched by the driving turn on/off signal for the compressors for supplying, or cutting off the supply of the utility voltage to the compressors;

an external temperature sensing part for sensing an external temperature of the compressors;

a second controlling part for providing a phase control signal and a switching control signal varied with a state (a size and a frequency) of the utility voltage and the sensed external temperature;

a current controlling part having an internal circuit system changeable in response to the switching control signal for controlling a phase of the utility voltage in response to the phase control signal for limiting the current of the utility voltage to the main windings of the compressors during starting of the compressors, and releasing the limiting of the current after the starting of the compressors to supply a regular sized current of the utility voltage; and a static capacitance controlling part having an internal circuit changeable in response to the switching control signal for supplying respective starting static capacitances and respective operative static capacitances to supplementary windings of the compressors during starting of the compressors, and supplying only the respective operative static capacitances to the supplementary windings after the starting of the compressors, in response to the control signal.

23. The device as claimed in claim 22, wherein the external temperature sensing part is a thermistor.

24. The device as claimed in claim 22, wherein the current controlling part supplies the current to the main windings from an initial starting of the compressors to a completion of the starting in a gradually increasing direction.

25. The device as claimed in claim 22, wherein the current controlling part includes:

a second switch for switching on/off between an output contact point of the first switch and the main windings in response to the switching control signal; and a phase controlling part connected between an input contact point and an output contact point of the second switch for controlling a phase of a voltage supplied to the main windings depending on switching on/off states of the second switch and the phase control signal.

26. The device as claimed in claim 25, wherein the phase controlling part is turned on for a longer time period by the varied phase control signal if the provided utility voltage is lower than a reference utility voltage, and the phase controlling part is turned on for a shorter time period by the varied phase control signal if the provided utility voltage is higher than a reference utility voltage.

27. The device as claimed in claim 25, wherein the second switch changes an internal circuit of the current controlling part in response to the switching control signal such that an output contact point of the first switch and the main windings are connected through the phase controlling part in starting, and the output contact point of the first switch and the main windings are connected directly after the starting of the compressors.

28. The device as claimed in claim 25, wherein the phase controlling part is a triac for controlling a phase of the utility voltage by using the phase control signal as a driving signal.

29. The device as claimed in claim 22, wherein the static capacitance controlling part includes:
a third switch having an input contact point connected to an output contact point of the first switch for being switched on/off in response to the switching control signal;
a starting capacitor having an input terminal connected to an output contact point of the third switch;
a fourth switch having an input contact point connected to an output terminal of the starting capacitor, a first output contact point connected to the supplementary winding of the first compressor, and a second output contact point connected to the supplementary winding of the second compressor, the input contact point being brought into contact with the first and second output contact points in a sequence in response to the switching control signal;
a first operating capacitor having a first terminal connected to an output contact point of the first switch, and a second terminal connected to the supplementary winding of the first compressor; and
a second operating capacitor having a first terminal connected to an output contact point of the first switch, and a second terminal connected to the supplementary winding of the second compressor.

30. The device as claimed in claim 29, wherein, when the first compressor is starting, the second switch is turned off, the third switch is turned on, and the fourth switch has the input contact point connected to the first output contact point on a side of the supplementary winding of the first compressor; when the second compressor is starting, the second switch is turned off, the third switch is turned on, and the fourth switch has the input contact point connected to the second output contact point on a side of the supplementary winding of the second compressor, and, after completion of starting of the first and second compressors, the second switch is turned on, the third switch is turned off, and the fourth switch is inoperative.

31. The device as claimed in claim 22, wherein the static capacitance controlling part includes:
a third switch having an input contact point connected to an output contact point of the first switch for being switched on/off in response to the switching control signal;
a first starting capacitor having a first terminal connected to an output contact point of the third switch, and a second terminal connected to the supplementary winding of the first compressor;
a first operating capacitor having a first terminal connected to an output contact point of the first switch, and a second terminal connected both to the second terminal of the first starting capacitor and the supplementary winding of the first compressor;
a fourth switch having an input contact point connected to an output contact point of the first switch;
a fifth switch having an input contact point connected to an output contact point of the fourth switch;
a second starting capacitor having a first terminal connected to an output contact point of the fifth switch, and a second terminal connected to the supplementary winding of the second compressor; and
a second operating capacitor having a first terminal connected both to an output contact point of the fourth switch and an input contact point of the fifth switch, and a second terminal connected both to a second terminal of the second starting capacitor and the supplementary winding of the second compressor.

32. The device as claimed in claim 31, wherein, in a first half of the starting of the compressors, the second switch is turned off (opened), the third switch is turned on (closed), the fourth switch is turned off, and the fifth switch is turned off, in a second half of the starting of the compressors, the second switch is turned off (opened), the third switch is turned off, the fourth switch is turned on, and the fifth switch is turned on, and, after completion of the starting of the compressors, the second switch is turned on, the third switch is turned off, the fourth switch is turned on, and the fifth switch is turned off.

33. A device for controlling supply of current and static capacitance to compressors comprising:
a utility voltage supply;
a first controlling part for controlling overall operation of tire first and second compressors, and providing driving turn on/off signals for the compressors according to a user's selection;
a first switch for being switched by the driving turn on/off signals for the compressors for supplying, or cutting off the supply of the utility voltage to the compressors;
a current detecting part for detecting currents to the main windings of the compressors;
a second controlling part for providing a phase control signal and a switching control signal varied with a state (a size and frequency) of the utility voltage, a display signal for displaying states of currents to the main windings detected at starting of the compressors;
a current controlling part having an internal circuit system changeable in response to the switching control signal for controlling a phase of the utility voltage in response to the phase control signal for limiting the current of the utility voltage to the main windings of the compressors during starting of the compressors, and releasing the limiting of the current after the starting of the compressors to supply a regular sized current of the utility voltage;
a display part for displaying the state of the detected current to outside of the device in response to the display signal; and
a static capacitance controlling part having an internal circuit changeable in response to the switching control signal for supplying respective starting static capacitances and respective operative static capacitances to the supplementary windings of the compressors during starting of the compressors, and supplying only the respective operative static capacitances to the supplementary windings after the starting of the compressors, in response to the switching control signal.

34. The device as claimed in claim 33, wherein the current controlling part is a resistor connected between the current controlling part and the main windings.

35. The device as claimed in claim 33, wherein the display part is an LED.

36. The device as claimed in claim 33, wherein, in response to the display signal, the LED flashes if the detected current to the main windings is greater than a preset first overcurrent, is turned on if the detected current is lower than the preset first overcurrent and higher than a preset second overcurrent (the first overcurrent>the second overcurrent), and is turned off if the detected current is lower than the preset second overcurrent.

37. The device as claimed in claim 33, wherein the current controlling part supplies the current to the main windings in response to the switching control signal from an initial starting of the compressors to a starting completion in a gradually increasing direction.

38. The device as claimed in claim 33, wherein the current controlling part includes:
   a second switch for switching on/off between an output contact point of the first switch and the main windings in response to the switching control signal; and
   a phase controlling part connected between an input contact point and an output contact point of the second switch for controlling a phase of a voltage supplied to the main windings depending on switching on/off states of the second switch and the phase control signal.

39. The device as claimed in claim 38, wherein the phase controlling part is turned on for a longer time period by the varied phase control signal if the provided utility voltage is lower than a reference utility voltage, and the phase controlling part is turned on for a shorter time period by the varied phase control signal if the provided utility voltage is higher than a reference utility voltage.

40. The device as claimed in claim 38, wherein the second switch is operated in response to the switching control signal such that an output contact point of the first switch and the main windings axe connected through the phase controlling part in starting of the compressors, and the output contact point of the first switch and the main windings are connected directly after the starting of the compressors.

41. The device as claimed in claim 38, wherein the phase controlling part is a triac to be driven in response to the phase control signal for controlling a phase of the voltage supplied to the main windings.

42. The device as claimed in claim 33, wherein the static capacitance controlling part includes
   a third switch having an input contact point connected to an output contact point of the first switch for being switched on/off in response to the switching control signal;
   a starting capacitor having an input terminal connected to an output contact point of the third switch;
   a fourth switch having an input contact point connected to an output terminal of the starting capacitor, a first output contact point connected to the supplementary winding of the first compressor, and a second output contact point connected to the supplementary winding of the second compressor, the input contact point being brought into contact with the first and second output contact points in a sequence in response to the switching control signal;
   a first operating capacitor having an input terminal connected to an output contact point of the first switch, and an output terminal connected to the supplementary winding of the first compressor; and
   a second operating capacitor having an input terminal connected to an output contact point of the first switch and an output terminal connected to the supplementary winding of the second compressor.

43. The device as claimed in claim 42, wherein, when the first compressor is starting, the second switch is turned off, the third switch is turned on, and the fourth switch has the input contact point connected to the first output contact point on a side of the supplementary winding of the first compressor; when the second compressor is starting, the second switch is turned off, the third switch is turned on, and the fourth switch has the input contact point connected to the second output contact point on a side of the supplementary winding of the second compressor, and, after completion of starting of the first and second compressors, the second switch is turned on, the third switch is turned off, and the fourth switch is inoperative.

44. The device as claimed in claim 33, wherein the static capacitance controlling part includes:
   a third switch having an input contact point connected to an output contact point of the first switch for being switched on/off in response to the switching control signal;
   a first starting capacitor having a first terminal connected to an output contact point of the third switch, and a second terminal connected to the supplementary winding of the first compressor;
   a first operating capacitor having a first terminal connected to an output contact point of the first switch, and a second terminal connected both to the second terminal of the first starting capacitor and the supplementary winding of the first compressor;
   a fourth switch having an input contact point connected to an output contact point of the first switch;
   a fifth switch having an input contact point connected to an output contact point of the fourth switch;
   a second starting capacitor having a first terminal connected to an output contact point of the fifth switch, and a second terminal connected to the supplementary winding of the second compressor; and
   a second operating capacitor having a first terminal connected both to an output contact point of the fourth switch and an input contact point of the fifth switch, and a second terminal connected both to a second terminal of the second starting capacitor and the supplementary winding of the second compressor.

45. The device as claimed in claim 44, wherein, in a first half of the starting of the compressors, the second switch is turned off (opened), the third switch is turned on (closed), the fourth switch is turned off, and the fifth switch is turned on, and, after completion of the starting of the compressors, the second switch is turned on, the third switch is turned off, the fourth switch is turned on, and the fifth switch is turned off.

46. A device for controlling supply of current and static capacitance to compressors comprising:
   a utility voltage supply for supplying a utility voltage;
   a first controlling part for controlling overall operation of the first and second compressors, and providing driving turn on/off signals for the compressors according to a user's selection; a first switch switchable in response to the driving turn on/off signals for the compressors for supplying the utility voltage to the compressors;
   a current detecting part for detecting respective currents to main windings of the compressors in starting of the compressors; a second controlling part for providing a phase control signal and a switching control signal varied with a state (a size and a frequency) of the utility voltage and the currents to the main windings in starting of the compressors;
   a current controlling part having an internal circuit system changeable in response to the switching control signal for controlling a phase of the utility voltage in response to the phase control signal for limiting the current of the utility voltage to the main windings of the compressors during starting of the compressors, and releasing the limiting of the current after the starting of the compressors to supply a regular sized current of the utility voltage; and a static capacitance controlling part having an internal circuit changeable in response to the switching control signal for supplying respective starting static capacitances and respective operative static capacitances to the supplementary windings of the compressors during starting of the compressors, and supplying only the respective operative static capacitances to the supplementary windings after the starting of the compressors, in response to the switching control signal.

47. The device as claimed in claim 46, wherein the current controlling part is a resistor connected between the current controlling part and the main windings.

48. The device as claimed in claim 46, wherein the current controlling part supplies the current to the main windings in response to the switching control signal from an initial starting of the compressors to a starting completion in a gradually increasing direction.

49. The device as claimed in claim 46, wherein the current controlling part includes:
    a second switch for switching on/off between an output contact point of the first switch and the main windings in response to the switching control signal; and
    a phase controlling part connected between an input contact point and an output contact point of the second switch for controlling a phase of a voltage supplied to the main windings depending on switching on/off states of the second switch and the phase control signal.

50. The device as claimed in claim 49, wherein the phase controlling part is turned on for a longer time period by the varied phase control signal if the provided utility voltage is lower that a reference utility voltage, and the phase controlling part is turned on for a shorter time period by the varied phase control signal if the provided utility voltage is higher than a reference utility voltage.

51. The device as claimed in claim 49, wherein the second switch is operated in response to the switching control signal such that an output contact point of the first switch and the main windings are connected through the phase controlling part in starting of the compressors, and the output contact point of the first switch and the main windings are connected directly after the starting of the compressors.

52. The device as claimed in claim 49, wherein the phase controlling part is a triac to be driven in response to the phase control signal for controlling a phase of the voltage supplied to the main windings.

53. The device as claimed in claim 46, wherein the static capacitance controlling part includes:
    a third switch having an input contact point connected to an output contact point of the first switch for being switched on/off in response to the switching control signal;
    a starting capacitor having an input terminal connected to an output contact point of the third switch;
    a fourth switch having an input contact point connected to an output terminal of the starting capacitor, a first output contact point connected to the supplementary winding of the first compressor, and a second output contact point connected to the supplementary winding of the second compressor, the input contact point being brought into contact with the first and second output contact points in a sequence in response to the switching control signal;
    a first operating capacitor having an input terminal connected to an output contact point of the first switch, and an output terminal connected to the supplementary winding of the first compressor; and
    a second operating capacitor having an input terminal connected to an output contact point of the first switch, and an output terminal connected to the supplementary winding of the second compressor.

54. The device as claimed in claim 53, wherein, when the first compressor is starting, the second switch is turned off, the third switch is turned on, and the fourth switch has the input contact point connected to the first output contact point on a side of the supplementary winding of the first compressor; when the second compressor is starting, the second switch is turned off, and the third switch is turned on, and the fourth switch has the input contact point connected to the second output contact point on a side of the supplementary winding of the second compressor, and, after completion of starting of the first and second compressor, the second switch is turned on, the third switch is turned off, and the fourth switch is inoperative.

55. The device as claimed in claim 46, wherein the static capacitance controlling part includes:
    a third switch having an input contact point connected to an output contact point of the first switch for being switched on/off in response to the switching control signal;
    a first starting capacitor having a first terminal connected to an output contact point of the third switch, and a second terminal connected to the supplementary winding of the first compressor;
    a first operating capacitor having a first terminal connected to an output contact point of the first switch, and a second terminal connected both to the second terminal of the first starting capacitor and the supplementary winding of the first compressor;
    a fourth switch having an input contact point connected to an output contact point of the first switch;
    a fifth switch having an input contact point connected to an output contact point of the fourth switch;
    a second starting capacitor having a first terminal connected to an output contact point of the fifth switch, and a second terminal connected to the supplementary winding of the second compressor; and
    a second operating capacitor having a first terminal connected both to an output contact point of the fourth switch and an input contact point of the fifth switch, and a second terminal connected both to a second terminal of the second starting capacitor and the supplementary winding of the second compressor.

56. The device as claimed in claim 55, wherein, in a first half of the starting of the compressors, the second switch is turned off (opened), the third switch is turned on (closed), the fourth switch is turned off, and the fifth switch is turned off, in a second half of the starting of the compressors, the second switch is turned off (opened), the third switch is turned off, the fourth switch is turned on, and the fifth switch is turned on, and, after completion of the starting of the compressors, the second switch is turned on, the third switch is turned off, the fourth switch is turned on, and the fifth switch is turned off.

57. A device for controlling supply of current and static capacitance to compressors comprising:
- a utility voltage supply for providing a utility voltage;
- a first controlling part for controlling overall operation of the two compressors, and providing driving turn on/off signals for the compressors according to a user's selection;
- a first switch for being switched by the driving turn on/off signals for the compressors for supplying the utility voltage to the compressors;
- a second controlling part for providing a switching control signal varied with a state (a size and a frequency) of the utility voltage;
- a current controlling part having an internal circuit system changeable in response to the switching control signal for limiting the current of the utility voltage by using its own resistance characteristics proportional to a temperature, to the main windings of the compressor during starting of the compressors, and releasing the limiting of the current after the starting of the compressors to supply a regular sized current of the utility voltage; and
- a static capacitance controlling part having an internal circuit changeable in response to the switching control signal for supplying respective starting static capacitances and respective operative static capacitances to supplementary windings of the compressors during starting of the compressors, and supplying only the respective operative static capacitances to the supplementary windings after the starting of the compressors, in response to the control signal.

58. The device as claimed in claim 57, wherein the current controlling part supplies the current to the main windings in response to the switching control signal from an initial starting of the compressors to a starting completion in a gradually increasing direction.

59. The device as claimed in claim 57, wherein the current controlling part includes:
- a second switch having an input contact point connected to an output contact point of the first switch, and an output contact point connected to the main windings for being switched on/off in response to the switching control signal; and
- a negative temperature coefficient resistor having an input terminal connected to an output contact point of the first switch, and an output terminal connected between the main windings, with the input terminal and the output terminal connected to an input contact point and an output contact point of the second switch respectively, for limiting sizes of the currents to be supplied to the main windings in starting of the compressors.

60. The device as claimed in claim 59, wherein the second switch changes an internal circuit of the current controlling part in response to the switching control signal such that an output contact point of the first switch and the main windings are connected through the negative temperature coefficient resistor in starting of the compressors, and the output contact point of the first switch and the main windings are connected directly after the starting of the compressors without passing through the negative temperature coefficient resistor.

61. The device as claimed in claim 57, wherein the static capacitance controlling part includes:
- a third switch having an input contact point connected to an output contact point of the first switch for being switched on/off in response to the switching control signal;
- a starting capacitor having an input terminal connected to an output contact point of the third switch;
- a fourth switch having an input contact point connected to an output terminal of the starting capacitor, a first output contact point connected to the supplementary winding of the first compressor, and a second output contact point connected to the supplementary winding of the second compressor, the input contact point being brought into contact with the first and second output contact points in a sequence in response to the switching control signal;
- a first operating capacitor having an input terminal connected to an output contact point of the first switch, and an output terminal connected to the supplementary winding of the first compressor; and
- a second operating capacitor having an input terminal connected to an output contact point of the first switch, and an output terminal connected to the supplementary winding of the second compressor.

62. The device as claimed in claim 61, wherein, when the first compressor is starting, the second switch is turned off, the third switch is turned on, and the fourth switch has the input contact point connected to the first output contact point on a side of the supplementary winding of the first compressor; when the second compressor is starting, the second switch is turned off, the third switch is turned on, and the fourth switch has the input contact point connected to the second output contact point on a side of the supplementary winding of the second compressor, and, after completion of starting of the first and second compressors, the second switch is turned on, the third switch is turned off, and the fourth switch is inoperative.

63. The device as claimed in claim 57, wherein the static capacitance controlling part includes;
- a third switch having an input contact point connected to an output contact point of the first switch for being switched on/off in response to the switching control signal;
- a first starting capacitor having a first terminal connected to an output contact point of the third switch, and a second terminal connected to the supplementary winding of the first compressor;
- a first operating capacitor having a first terminal connected to an output contact point of the first switch, and a second terminal connected both to the second terminal of the first starting capacitor and the supplementary winding of the first compressor;
- a fourth switch having an input contact point connected to an output contact point of the first switch;
- a fifth switch having an input contact point connected to an output contact point of the fourth switch;
- a second starting capacitor having a first terminal connected to an output contact point of the fifth switch, and a second terminal connected to the supplementary winding of the second compressor; and
- a second operating capacitor having a first terminal connected both to an output contact point of the fourth switch and an input contact point of the fifth switch, and a second terminal connected both to a second terminal of the second starting capacitor and the supplementary winding of the second compressor.

64. The device as claimed in claim 63, wherein, in a first half of the starting of the compressors, the second switch is turned off (opened), the third switch is turned on (closed), the fourth switch is turned off, and the fifth switch is turned off, in a second half of the starting of the compressors, the second switch is turned off (opened), the third switch is turned off, the fourth switch is turned on, and the fifth switch is turned on, and, after completion of the starting of the compressors, the second switch is turned on, the third switch is turned off, the fourth switch is turned on, and the fifth switch is turned off.

65. A method for controlling supply of current and static capacitance to compressors, comprising the steps of:

(a) providing a utility voltage to the compressors;

(b) in starting of the capacitors, supplying a current of the utility voltage to main windings of the compressors with the current limited, supplying respective starting static capacitances from the current of the utility voltage to supplementary windings of the compressors in a sequence, and supplying respective operative static capacitances from the current of the utility voltage to the supplementary windings; and (c) after the starting of the compressors, supplying only respective static capacitances from only the current of the utility voltage to the supplementary windings, and supplying the current from the utility voltage to the main windings.

66. The method as claimed in claim 65, wherein the current to the main windings is obtained by controlling a phase of the utility voltage.

67. The method as claimed in claim 65, wherein a time period of the starting of the compressors includes an initial time period of the starting, a middle time period of the starting, and a final time period of the starting, wherein: a first sized size limited current is provided to the main windings in the initial time period of the starting, a current gradually increasing from the first size limited current to a second size corresponding to the utility voltage is provided to the main windings in the middle time period of the starting; and the second sized current corresponding to the utility voltage is provided to the main windings after the final time period of the starting during operation of the compressors.

68. A method as claimed in claim 65, further comprising the steps of:

(d) sensing a size of the utility voltage; and (e) controlling a phase of the current of the utility voltage according to the size of the sensed utility voltage, to limit current to the main windings.

69. A method as claimed in claim 65, further comprising the steps of:

(f) sensing an external temperature of the compressors; and (g) controlling a phase of the voltage to the main windings of the compressors varied with the sensed external temperature of the compressors.

70. The method as claimed in claim 69, wherein the step (g) includes the steps of:

comparing the sensed temperature and a preset seasonal reference value; and controlling a phase of the voltage to the main windings according to a result of the comparison.

71. The method as claimed in claim 65, further comprising the steps of:

(i) sensing the current to the main windings in the starting of the compressors;

(j) comparing the sensed current to at least one preset reference value; and (k) displaying a state of the current to the main windings on a display according to a result of the comparison.

72. The method as claimed in claim 71, wherein the display is an LED.

73. The method as claimed in claim 71, wherein the step (k) includes the step of flashing the display if the sensed current to the main windings is greater than a preset first overcurrent, turning on if the sensed current is lower than the preset first overcurrent and higher than a preset second overcurrent (the first overcurrent>the second overcurrent), and turning off if the sensed current is lower than the preset second overcurrent.

74. The method as claimed in claim 65, further comprising the steps of:

(l) detecting the current to the main windings during starting of the compressors;

(m) obtaining a starting voltage value from the detected current value;

(n) comparing the starting voltage value to preset at least one reference voltage value; and (o) controlling a phase of the voltage to the main windings according to a result of the comparison.

75. The method as claimed in claim 74, wherein the step of (o) includes the step of cutting off the supply of the current to stop driving of the compressors when the starting voltage value is higher than a preset first reference voltage value, controlling the phase of the voltage to drop a size of the current when the starting voltage value is lower than the first reference voltage and higher than a preset second reference voltage, and maintaining an initial phase of the current as it is when the starting voltage value is lower than the second reference voltage value.

76. The method as claimed in claim 65, wherein the limitation of the size of the current to the main windings in the starting of the compressors is performed by a negative temperature coefficient resistor.

77. The method as claimed in claim 65, wherein the limitation of the size of the current to the main windings in the starting of the compressors is performed by a triac.

78. The method as claimed in claim 77, wherein the triac is turned on for a longer time period by the varied phase control signal if the utility voltage is lower than a reference utility voltage, and is turned on for a shorter time period by the varied phase control signal if the utility voltage is higher than a reference utility voltage.

* * * * *